US006871216B2

(12) United States Patent
Miller et al.

(10) Patent No.: US 6,871,216 B2
(45) Date of Patent: Mar. 22, 2005

(54) METHODS AND SYSTEMS TO MANAGE AND TRACK THE STATES OF ELECTRONIC MEDIA

(75) Inventors: Graham Miller, San Francisco, CA (US); Michael Hanson, Menlo Park, CA (US); Brian Axe, San Francisco, CA (US); Steven Richard Evans, Los Altos Hills, CA (US)

(73) Assignee: Zaplet, Inc., Redwood Shores, CA (US)

( * ) Notice: Subject to any disclaimer, the term of this patent is extended or adjusted under 35 U.S.C. 154(b) by 360 days.

(21) Appl. No.: 10/244,973

(22) Filed: Sep. 16, 2002

(65) Prior Publication Data

US 2003/0028607 A1 Feb. 6, 2003

Related U.S. Application Data

(63) Continuation of application No. 09/760,373, filed on Jan. 12, 2001, now Pat. No. 6,453,337, which is a continuation-in-part of application No. 09/426,648, filed on Oct. 25, 1999, now Pat. No. 6,463,461, and a continuation-in-part of application No. 09/427,152, filed on Oct. 25, 1999, now Pat. No. 6,505,233, and a continuation-in-part of application No. 09/427,378, filed on Oct. 25, 1999, now Pat. No. 6,496,849
(60) Provisional application No. 60/176,230, filed on Jan. 14, 2000.

(51) Int. Cl.[7] .............................................. G06F 15/16
(52) U.S. Cl. ...................... 709/206; 709/201; 709/202; 709/204; 709/205; 709/207; 709/217
(58) Field of Search ................................ 709/201, 202, 709/204–205, 206, 217

(56) References Cited

U.S. PATENT DOCUMENTS

| 4,503,499 A | 3/1985 | Mason et al. |
| 4,567,600 A | 1/1986 | Massey et al. |
| 4,645,873 A | 2/1987 | Chomet |

(List continued on next page.)

FOREIGN PATENT DOCUMENTS

| EP | 739 115 A2 | 10/1996 |
| EP | 0 959 592 A2 | 11/1999 |
| EP | 1 085 444 A2 | 3/2001 |

OTHER PUBLICATIONS

Goldberg et al., "Active Mail–A Framework For Implementing Groupware," Cswc Proceedings Nov. 1992: 75–83.

Brothers et al., "Supporting Informal Communication Via Ephemeral Interest Groups," Cswc Proceedings Nov. 1992: 84–90.

Borstein, Nathaniel S., "Computational Mail As Network Infrastructure For Computer–Supported Cooperative Work," Cswc Proceedings Nov. 1992: 67–74.

"Lotus Notes 5 Releasestep By Step, A Beginner's Guide To Lotus Notes," 1995–1999, Pp. 1–228.

"Quick Courses In Microsoft Outlook 2000," Microsoft Press, Online Press Inc., 1999, Pp. 1–148.

J. Palme, et al., "MIME Encapsulation of Aggregate Documents, Such As HTML (MHTML)," Mar. 1999, XP 002209393, pp. 1–28.

IBM Corp, IBM Technical Disclosure Bulletin, "Method for Managing Files Referenced in In–Basket Items," vol. 36, No. 07, Jul. 1993, p. 469.

*Primary Examiner*—Saleh Najjar
(74) *Attorney, Agent, or Firm*—Hickman, Palermo, Truong & Becker, LLP

(57) ABSTRACT

Method and systems are described which can be used to track and manage the states of electronic media in a communications network. The electronic medium can be restored, archived, and used to create new electronic media. Moreover, the electronic medium can be superseded and deleted. Additionally, notification processes can be used to prioritize and emphasize certain portions of the electronic medium. Access to the electronic medium may also be blocked or limited to certain recipients of the medium.

30 Claims, 14 Drawing Sheets

U.S. PATENT DOCUMENTS

| | | |
|---|---|---|
| 5,043,876 A | 8/1991 | Terry |
| 5,089,954 A | 2/1992 | Rago |
| 5,093,901 A | 3/1992 | Cree et al. |
| 5,093,918 A | 3/1992 | Heyen et al. |
| 5,129,057 A | 7/1992 | Strope et al. |
| 5,161,214 A | 11/1992 | Addink et al. |
| 5,245,532 A | 9/1993 | Mourier |
| 5,299,305 A | 3/1994 | Oomae et al. |
| 5,325,310 A | 6/1994 | Johnson et al. |
| 5,363,507 A | 11/1994 | Nakayama et al. |
| 5,377,354 A | 12/1994 | Scannell et al. |
| 5,392,400 A | 2/1995 | Berkowitz et al. |
| 5,408,470 A | 4/1995 | Rothrock et al. |
| 5,410,646 A | 4/1995 | Tondevold et al. |
| 5,418,908 A | 5/1995 | Keller et al. |
| 5,428,784 A | 6/1995 | Cahill, Jr. |
| 5,535,332 A | 7/1996 | Ishida |
| 5,537,142 A | 7/1996 | Fenouil |
| 5,555,426 A | 9/1996 | Johnson et al. |
| 5,557,723 A | 9/1996 | Holt et al. |
| 5,579,472 A | 11/1996 | Keyworth et al. |
| 5,592,626 A | 1/1997 | Papadimitriou et al. |
| 5,602,841 A | 2/1997 | Lebizay et al. |
| 5,608,872 A | 3/1997 | Schwartz et al. |
| 5,615,269 A | 3/1997 | Micali |
| 5,617,539 A | 4/1997 | Ludwig et al. |
| 5,632,018 A | 5/1997 | Otorii |
| 5,647,002 A | 7/1997 | Brunson |
| 5,664,207 A | 9/1997 | Crumpler et al. |
| 5,687,317 A | 11/1997 | Hughes et al. |
| 5,689,642 A | 11/1997 | Harkins et al. |
| 5,692,125 A | 11/1997 | Schloss et al. |
| 5,706,452 A | 1/1998 | Ivanov |
| 5,727,165 A | 3/1998 | Ordish et al. |
| 5,732,400 A | 3/1998 | Mandler et al. |
| 5,744,670 A | 4/1998 | Motoyuki et al. |
| 5,757,699 A | 5/1998 | Takeshima et al. |
| 5,781,732 A | 7/1998 | Adams |
| 5,790,677 A | 8/1998 | Fox et al. |
| 5,794,207 A | 8/1998 | Walker et al. |
| 5,796,396 A | 8/1998 | Rich |
| 5,799,191 A | 8/1998 | Moriyasu et al. |
| 5,799,320 A | 8/1998 | Klug |
| 5,819,032 A | 10/1998 | De Vries et al. |
| 5,819,092 A | 10/1998 | Ferguson |
| 5,819,274 A | 10/1998 | Jackson, Jr. |
| 5,821,925 A | 10/1998 | Carey et al. |
| 5,825,883 A | 10/1998 | Archibald et al. |
| 5,826,242 A | 10/1998 | Montulli |
| 5,835,713 A | 11/1998 | Fitzpatrick et al. |
| 5,842,178 A | 11/1998 | Giovannoli |
| 5,848,396 A | 12/1998 | Gerace |
| 5,850,430 A | 12/1998 | Hamalainen |
| 5,850,517 A | 12/1998 | Verkler et al. |
| 5,855,020 A | 12/1998 | Kirsch |
| 5,862,223 A | 1/1999 | Walker et al. |
| 5,862,330 A | 1/1999 | Anupam et al. |
| 5,872,924 A | 2/1999 | Nakayama et al. |
| 5,884,035 A | 3/1999 | Butman et al. |
| 5,884,325 A | 3/1999 | Bauer et al. |
| 5,892,761 A | 4/1999 | Stracke, Jr. |
| 5,897,622 A | 4/1999 | Blinn et al. |
| 5,905,863 A | 5/1999 | Knowles et al. |
| 5,909,689 A | 6/1999 | Van Ryzin |
| 5,911,045 A | 6/1999 | Leyba et al. |
| 5,913,040 A | 6/1999 | Rakavy et al. |
| 5,913,920 A | 6/1999 | Adams et al. |
| 5,918,054 A | 6/1999 | Jury |
| 5,923,848 A | 7/1999 | Goodhand et al. |
| 5,926,798 A | 7/1999 | Carter |
| 5,930,471 A | 7/1999 | Milewski et al. |
| 5,933,811 A | 8/1999 | Angles et al. |
| 5,937,160 A | 8/1999 | Davis et al. |
| 5,937,161 A | 8/1999 | Mulligan et al. |
| 5,944,785 A | 8/1999 | Pommier et al. |
| 5,945,989 A | 8/1999 | Freishtat et al. |
| 5,948,057 A | 9/1999 | Berger et al. |
| 5,948,070 A | 9/1999 | Fujita |
| 5,951,652 A | 9/1999 | Ingrassia, Jr. et al. |
| 5,956,693 A | 9/1999 | Geerlings |
| 5,960,404 A | 9/1999 | Chaar et al. |
| 5,963,947 A | 10/1999 | Ford et al. |
| 5,966,512 A | 10/1999 | Bates et al. |
| 5,970,470 A | 10/1999 | Walker et al. |
| 5,970,479 A | 10/1999 | Shepherd |
| 5,974,430 A | 10/1999 | Mutschler, III et al. |
| 5,978,836 A | 11/1999 | Ouchi |
| 5,987,376 A | 11/1999 | Olson et al. |
| 5,995,096 A | 11/1999 | Kitahara et al. |
| 5,995,097 A | 11/1999 | Tokumine et al. |
| 6,006,200 A | 12/1999 | Boies et al. |
| 6,009,410 A | 12/1999 | Lemole et al. |
| 6,012,083 A | 1/2000 | Savtisky et al. |
| 6,012,090 A | 1/2000 | Chung et al. |
| 6,014,502 A | 1/2000 | Moraes |
| 6,014,644 A | 1/2000 | Erickson |
| 6,014,688 A | 1/2000 | Venkatraman et al. |
| 6,023,686 A | 2/2000 | Brown |
| 6,025,841 A | 2/2000 | Finkelstein et al. |
| 6,041,308 A | 3/2000 | Walker et al. |
| 6,044,205 A | 3/2000 | Reed et al. |
| 6,044,403 A | 3/2000 | Gerszberg et al. |
| 6,047,311 A | 4/2000 | Ueno |
| 6,049,787 A | 4/2000 | Takahashi et al. |
| 6,055,519 A | 4/2000 | Kennedy et al. |
| 6,055,522 A | 4/2000 | Krishna et al. |
| 6,084,883 A | 7/2000 | Norrell et al. |
| 6,092,074 A | 7/2000 | Rodkin et al. |
| 6,105,055 A | 8/2000 | Pizano |
| 6,115,384 A | 9/2000 | Parzych |
| 6,134,534 A | 10/2000 | Walker et al. |
| 6,134,582 A | 10/2000 | Kennedy |
| 6,141,010 A | 10/2000 | Hoyle |
| 6,144,991 A | 11/2000 | England |
| 6,151,588 A | 11/2000 | Tozzoli et al. |
| 6,151,621 A | 11/2000 | Colyer et al. |
| 6,155,840 A | 12/2000 | Sallette |
| 6,161,137 A | 12/2000 | Ogdon et al. |
| 6,161,149 A | 12/2000 | Achacoso et al. |
| 6,173,316 B1 | 1/2001 | Deboor et al. |
| 6,182,052 B1 | 1/2001 | Fulton et al. |
| 6,185,602 B1 | 2/2001 | Bayrakeri |
| 6,205,478 B1 | 3/2001 | Sugano et al. |
| 6,212,553 B1 | 4/2001 | Lee et al. |
| 6,219,054 B1 | 4/2001 | Komoda et al. |
| 6,226,670 B1 | 5/2001 | Ueno |
| 6,230,156 B1 | 5/2001 | Hussey |
| 6,230,185 B1 | 5/2001 | Salas et al. |
| 6,247,045 B1 | 6/2001 | Shaw et al. |
| 6,260,124 B1 | 7/2001 | Crockett et al. |
| 6,317,777 B1 | 11/2001 | Skarbo |
| 6,336,134 B1 | 1/2002 | Varma |
| 6,338,086 B1 | 1/2002 | Curtis |
| 6,594,673 B1 * | 7/2003 | Smith et al. ............. 707/104.1 |

* cited by examiner

METHODS AND SYSTEMS TO MANAGE AND TRACK THE STATES OF ELECTRONIC MEDIA

CROSS-REFERENCE TO RELATED APPLICATIONS; PRIORITY CLAIMS

This application claims benefit of Provisional Appln. No. 60/176,230, filed on Jan. 14, 2000, the entire contents of which is hereby incorporated by reference as if fully set forth herein, under 35 U.S.C. §119(e). This application claims benefit as a Continuation of application Ser. No. 09/760,373, filed Jan. 12, 2001, now U.S. Pat. No. 6,453,337, which is a continuation-in-part of applications Ser. Nos. 09/426,648 now U.S. Pat. No. 6,463,461, filed Oct. 25, 1999; 09/427,152, now U.S. Pat. No. 6,505,233, filed Oct. 25, 1999; and 09/427,378, now U.S. Pat. No. 6,496,849, filed Oct. 25, 1999, the entire contents of which are hereby incorporated by reference as if fully set forth herein, under 35 U.S.C. §120.

BACKGROUND

The present invention relates generally to communication networks, and more particularly, to methods and systems to manage and track the states of electronic media in such networks.

Communication networks are used to share information. The information is passed between users of the network using a common medium. For example, many individuals communicate over the Internet using a medium such as electronic mail. As the medium is passed between users, the medium changes states. The change of the states may occur quickly and become too complex for the user to track and manage. Thus, to determine the current or actual state of the medium and its contents tends to cause confusion and lead to a waste of a user's time and resources.

DETAILED DESCRIPTION

Figure 1:
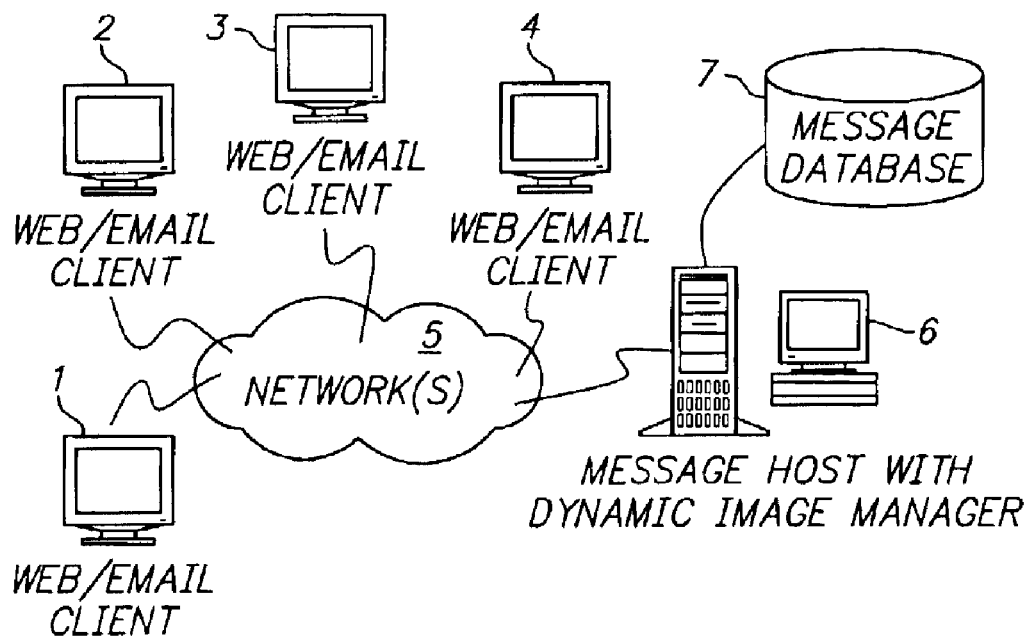
FIG. 1 is a simplified diagram of a sample network including participants of a group connected to the network.

In general, the present invention is directed to methods and systems for managing or tracking the change of states of one or more electronic media. An electronic medium may have at least one dynamic content region that is stored in a database of a server. Input composed by participants of a group or other external sources is accepted by the server to update the dynamic content region of the electronic medium in the server. The updating of the dynamic content region is preferably performed asynchronously relative to the sending and receiving of the input from any of the participants or external sources. In this way, the content of the electronic medium is always current.

The information communicated between participants of the group is not current when sent by any participant, but current when accessed or read by a participant. Information is not merely current when the medium was sent to a receiving participant to communicate information; rather, the current content from the server of the electronic medium is retrieved, when the receiving participant accesses the electronic medium. This means that multiple virtual instances of the electronic medium can be reduced to a single thread. This also usefully reduces the amount of media, such as electronic mail messages carrying redundant static content that is communicated among the participants of the group. Collaboration of information is also more rapid and interactive among participants of the group.

The electronic medium can also be updated by a variety of external sources, such as by an attached server containing stock quotes or news feeds. In this way, the electronic medium can be used to supply different types of information to the participant in a fast, efficient, and flexible manner.

A suitable system is a communication network that is configured with participants that support a variety of protocols, such as those for supporting electronic mail ("e-mail") and the Internet. The electronic medium for communicating information and that supports collaboration among participants in a group connected to the network will be referred to as a "zaplet". The zaplet contains static content and dynamic content regions. The term dynamic content can be defined as regions of the zaplet that are retrieved from the server, when the zaplet is accessed by a participant or external source. The term static content can be defined as regions of the zaplet that are not retrieved at the time the zaplet is accessed by a participant or external source. The dynamic content of the zaplet can be changed and updated by the participants in the group or by other external sources, such as an external server containing the most recent news feeds or stock quotes. The content of the zaplet can be stored in a database in a server of the network. The zaplet is also customizable and programmable, containing various text and graphical regions to execute a variety of functions and applications. Preferably, each of the regions may be configured by the participants or the server in the network. When a participant performs an open action to access the zaplet, the zaplet may open and the server serves and displays the then current content in the database to a participant.

An "open action" can be defined as an action by any of the participants or the server that causes the static and/or the dynamic content of the zaplet to be retrieved from the server. For example, an open action may occur when a user invokes the File Open command from a menu bar within an email reading program while an email message containing a zaplet is selected. Alternatively, the server could perform an open action using, for example, push technology processes.

The term collaboration can be defined as an activity in which one or more participants or services share information or points-of-view with an intent of reaching a decision, making a choice, conducting a financial transaction, or sharing knowledge.

The dynamic content can be represented in a dynamic content region in the zaplet, and includes text or images, such as rich text HTML, based on mark-up languages or image construction languages. Consequently, the zaplet can supply all the look and feel possibilities of the World Wide Web ("Web"), and also the participants can experience interactions and collaborate with each other with increased efficiently than in known e-mail systems.

Communication among a group of participants is simple. Preferably, the server used to generate and manage the zaplet is scalable for a particular implementation. Its scalability allows quick user response under heavy load conditions on the server. Further, the zaplet can be easily accessed by the participant, such as from a desktop computer. Accordingly, the participant will have constant access to his or her zaplet at all times, and thereby can collaborate with other participants in the group quickly, simply, and efficiently. This means that the participant need not repeatedly type-in the URL of a portal web site to regain access to a particular application, such as a discussion; the zaplet may be easily accessible and open in an unobtrusive manner.

Unless otherwise defined, all technical and scientific terms used herein have substantially the same meaning as commonly understood by one of ordinary skill in the art to which the invention belongs. Although many methods and systems similar or equivalent to those described herein can be used in the practice of the present invention, suitable methods and systems are described below. Additionally, the methods, systems, and examples described herein are illustrative only and not intended to be limiting.

Other features and advantages of the invention will be apparent from the following detailed description, the drawings, and from the claims.

FIG. 1 illustrates a plurality of participants 1, 2, 3, and 4 of a group that are coupled to a network 5. Any number of participants may be connected to the network 5. The term participant can be defined as an entity or system that is capable of performing or executing a variety of functions on the zaplet as described herein. For simplicity, however, the following description will be made to participants 1–4. Each of the participants 1–4 may include any specific or general computer system that is equipped to receive or read e-mail messages using standard e-mail protocols, such as the Simple Mail Transfer Protocol (SMTP) and the Multipurpose Internet Mail Extensions (MIME), or navigate the Web. The computer may be, for example, a personal computer ("P.C."), an Apple Macintosh, a Unix workstation, or other computing machine that runs a windows-based operating system. A suitable computer may also include a modem, a monitor, a keyboard, a mouse, system software including support for TCP/IP communication, and browser software.

Alternatively, the participants 1–4 may include other devices that are capable of transmitting or receiving e-mail messages, forms, or zaplets, such as Palm computers provided by 3Com Corporation, Windows CE-based devices, messaging enabled cellular telephones, pagers, television set top boxes, e.g., Web T.V., or portable computers. The participants 1–4 may further include other devices that are capable of processing text or voice messaging.

The network 5 may be any local or global computer network. For example, the network 5 may be the Internet, a telephone network, a wireless communications network, a satellite communications network, or other similar data networks.

For simplicity, the following description will be made using a systems and methods configured to support any of the below listed e-mail protocols and data structures. Other configurations are also possible. For example, voicemail using interactive voice systems could be configured to provide voice messages as current when heard dynamic content. Each of the participants 1–4 is configured to support a variety of e-mail protocols and mark-up languages, such as SMTP, MIME, Hypertext Mark-up Language ("HTML"), Extensible Mark-up Language ("XML"), Standardized Generalized Mark-up Language ("SGML"), or similar e-mail protocols and/or mark-up languages.

FIG. 1 also shows a server 6 that is connected to the network 5. The server 6 is preferably configured to manage the dynamic content, routing, and updating of electronic forms, messages, or zaplets among the participants 1–4. The server 6 is connected to a message database 7 that is used to manage the dynamic content of zaplets. Other data 20 management resources may also be used.

Figure 2:
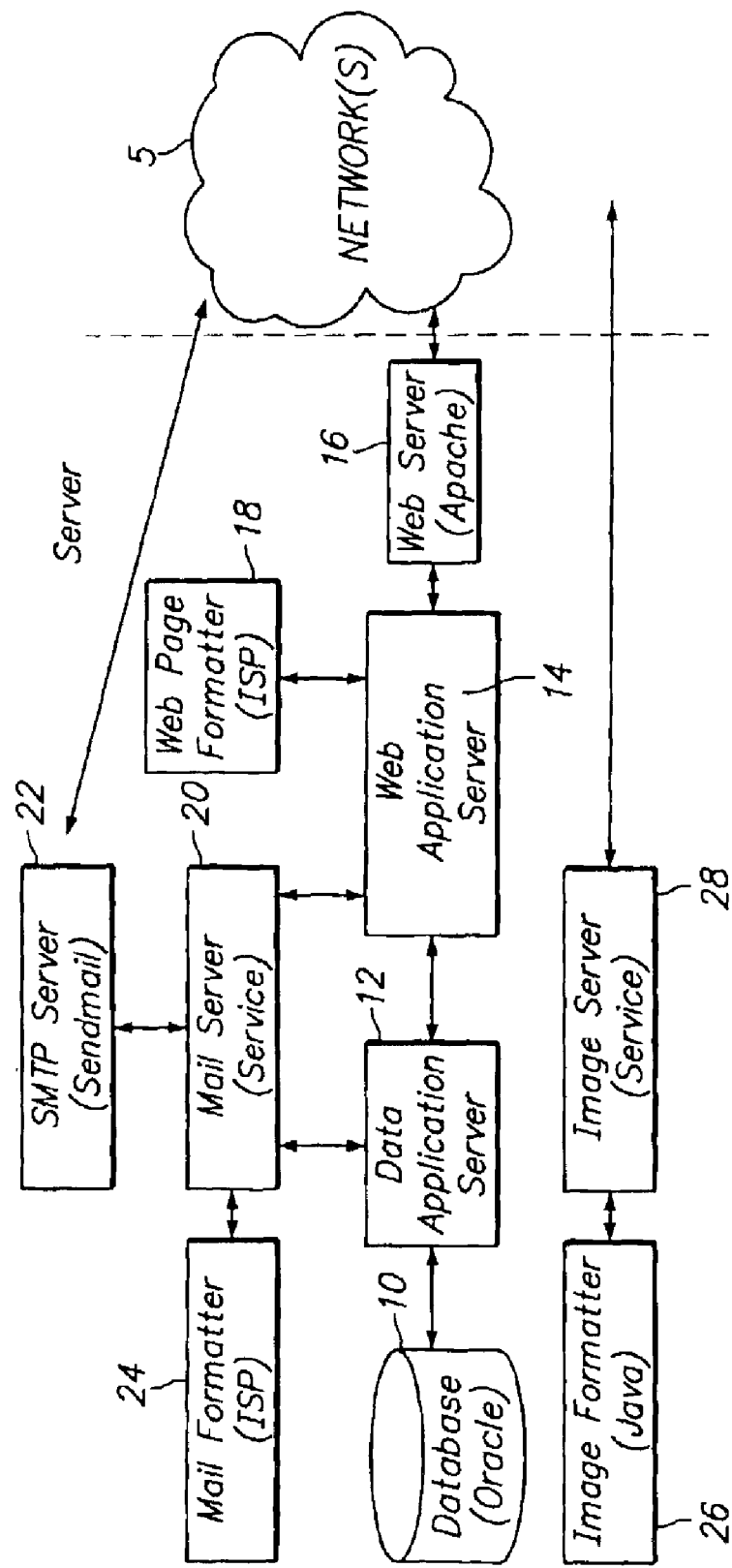
FIG. 2 illustrates a schematic diagram showing data flows of functional components of the network of FIG. 1.

FIG. 2 illustrates a simplified block diagram showing data flows of various functional components of the server 6. The server 6 includes a database 10. The database 10 may be a relational database, such as commercially available from Oracle. The database 10 may include multiple physical databases and may be implemented at a single site or distributed among many sites. The database 10 may also be implemented using object-oriented databases, object-relational databases, or hierarchical file structures.

The database 10 may include information that is specific to any participant or electronic form, message, or zaplet. Contents of the database 10 may include demographic data, participant credit card and payment information, participant preference information, generic form, message, or zaplet information, such as recipients or senders of the group, subject identifiers, or message specific information, and usage statistics for the electronic forms, messages, and zaplets and/or a web site. The database 10 may also store electronic 10 forms that act as blanks for the creation of the zaplets. The database 10 may also include images and web pages used in the creation of the zaplets and also used in the presentation of any dynamic region of the zaplet. The database 10 may also maintain a record of the history of changes that have been made to any dynamic content region of the zaplet discussed below. This record may also be propagated along with any dynamic content to one of the participants parsing the electronic message and zaplet, as discussed below. An example configuration for storing and processing various content in the database 10 is illustrated in the attached Appendix A, which is herein incorporated by reference.

FIG. 2 also shows a data application server 12 is coupled to the database 10. The server 12 is configured with, for example, a set of Java classes or any other high level programming language built using, for example, an Enhydra application server or any of a variety of other tools for object-relational translation. The data application server 12 is used for translating the content in the database 10 into Java objects, for use by a web application server 14. The data application server 12 may also be configured to cache some data to reduce the load on the database 10.

A web server 16 is included in the server 6 to connect to the participants 1–4 and is connected to the web application server 14 and can be any commercially available web server, such as an Apache server. The web server 16 is configured to manage requests from browsers at the participants 1–4, to manage session information, to send and receive forms, or zaplets transmitted to or from the participants 1–4, and to serve HTML data and static images to the participants 1–4.

The web application server 14 can be configured using a set of Java classes built-on top of the data application server 12. The web application server 14 is responsible for executing business logic associated with the electronic forms, messages, and zaplets. For example, the web application server 14 may manage message, form, and zaplet manipulation, deadlocks in the network 5, generate a URL and content associated with a specific zaplet or form, format the zaplet, message, or form, handle message authorizing, and handle participant record editing and participant interaction with various zaplets, forms, and messages.

A web page formatter 18 is connected to the web application server 14. The web page formatter 18 is used to handle the basic styles and layouts of various components of the zaplets, messages, or forms. Further details of the preferred business logic configured in pseudocode executable by a system and describing a method for initiating, sending, updating and displaying the zaplet, forms, and messages can be found in attached Appendix A.

The web page formatter 18 may be configured to operate using a Java Server Page ("JSP") construct.

FIG. 2 also shows that the server 5 includes a mail server 20 coupled to the web application server 14 and the data application server 12. The mail server 20 handles the operations of the e-mail protocol necessary to support a variety of zaplets, forms, and messages. For a given message, form, or zaplet, the mail server 20 retrieves data associated with the medium from the data application server 12, and from any operations of the business logic of the web application server 14. The mail server 20 then formats the static content for the medium utilizing an associated mail formatter 24 including a command to retrieve the dynamic content. The mail formatter 24 includes operations that can be used for the basic styles and layouts of the common elements of the zaplets, forms, or messages. Once the mail server 20 has compiled the required information from the data application server 12 and web application server 14, the mail server 20 may attach necessary header information to the zaplet, form, or message. For example, the header information may make an e-mail message compliant with the MIME standard. The mail server 20 then transmits the produced message to a mail transport server 22. The mail transport server 22 routes the message through the network 5. The mail server 20 may also be configured to manage bounced and undelivered messages, forms, or zaplets, and also alert the appropriate participants of these conditions. The mail server 20 may also communicate with the web application server to validate the addresses of the various participants. The mail server 20 may also receive responses via the interaction region 225 discussed below from any participant who is not connected to the network 10 or "off-line" when reading the zaplet. In this configuration, the participant can send input back to the server 6 to be dynamically updated, after he or she is re-connected to the network 10. In this way, the participant can contribute to a zaplet even in the absence of the dynamic content and without having to get back to the zaplet when connected "on-line".

The mail formatter 24 may be implemented using a JSP construct.

The mail transport server 22 may use SMTP, and can be implemented using a number of commercially available or open source e-mail servers, including Sendmail and the Exchange server.

The server 6 also includes an image server 28 that is used for connection to the participants 1–4. An image formatter 26 is connected to the image server 28. The image server 28 may be implemented using a web server (servlet). The image server 28 takes information from Hypertext Transfer Protocol ("HTTP") requests from the participants 1–4 and translates the information using predefined schemes into human viewable images that are encoded in a format compatible with known web browsers. The image server 28 may be configured separately from the web server 16, as shown in FIG. 2. This configuration may increase the scalability of the server 6. Alternatively, the web server 16 and the image server 28 can be configured together. The image formatter 28 may be configured using a Java construct. The image formatter 28 formats the image into a compliant standard, such as Graphical Interchange Format ("GIF"), Joint Photographics Experts Group ("JPEG"), or Portable Network Graphics ("PNG"), for the participants 1–4.

Figure 3:
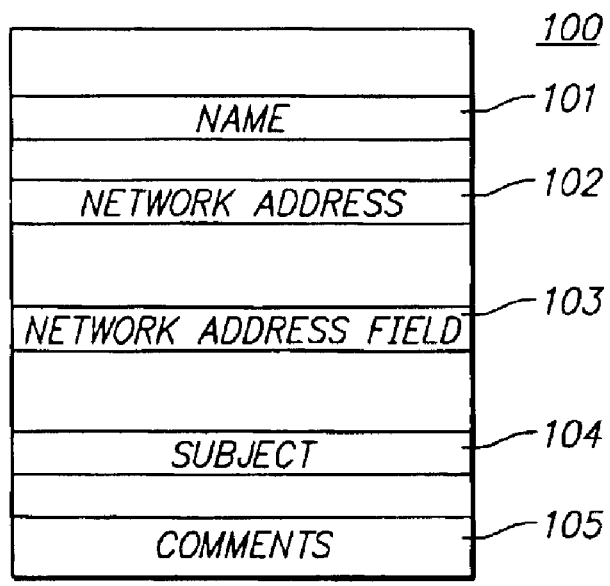
FIG. 3 illustrates an example electronic form to initiate a zaplet.

FIG. 3 illustrates an exemplary electronic form 100 that can be used to compose and initiate a zaplet among the participants 1–4. The electronic form may be, for example, an HTML form. The electronic form 100 can be accessed via a web site sent by the server 6 to the participants 1–4, or may reside as a template at the participants 1–4.

The electronic form 100 can be stored in database 10, reside on a device of a participant, such as in a memory of a computer, or can be sent to a participant via a communications protocol, such as e-mail. The electronic form 100 may be blank or partially completed. To partially complete the form, the server 6 may contain prior knowledge of the use of the form using, for example, "cookies" or other suitable techniques.

The electronic form 100 includes a name field 101 that specifies the creating participant's name and a network address field 102 that specifies a specific address associated with the creating participant, such as an e-mail address. The electronic form 100 can also include a network address field 103 that includes network addresses of the participants that should receive the zaplet. The list of network addresses in the field 103 may include the network address of the creating participant. The list of network addresses may be explicitly inputted by the creating participant using a keyboard, imported from a folder or other file residing at the creating participant, or imported by the creating participant from a peripheral device, such as a Palm Pilot provided by 3Com. Alternatively, the creating participant can provide the list of network addresses to the server 6. In this configuration, the server 6 may input the list of network addresses into the field 103, when the creating participant accesses the electronic form 100, as described below. This means that the field 103 will be completed for the creating participant, when the electronic form 100 is accessed. At this stage, the creating participant may add or delete network addresses from the list provided by the server 6.

The electronic form 100 may also include a subject field 104 and any number of question, choice or comment fields 105. The creating participant may describe the subject matter of the zaplet in the subject field 104 and supply details regarding the zaplet, in the comment field 105. In one configuration, each of the fields 101, 102, 103, 104, and 105 are part of a static region. The electronic form 100 may also include other applicable fields, such as for a title of the zaplet, fields for soliciting information from the participant, such as his/her address, links to other zaplets, a description field to receive an input, such as a URL, an image or binary data field, or option fields to specify choices, such as a poll choice. The electronic form 100 can be used to initiate a variety of zaplets for different applications, which are herein referred to as "zaplet processes". Once the electronic form 100 is created, it is sent to the server 6. The server 6 then sends an e-mail message to the participants listed in the network address field 103 to notify the receiving participants that a zaplet process has been initiated. The e-mail message is opened and parsed, and the zaplet is essentially immediately accessed from the server 6 as described below.

Figure 4:
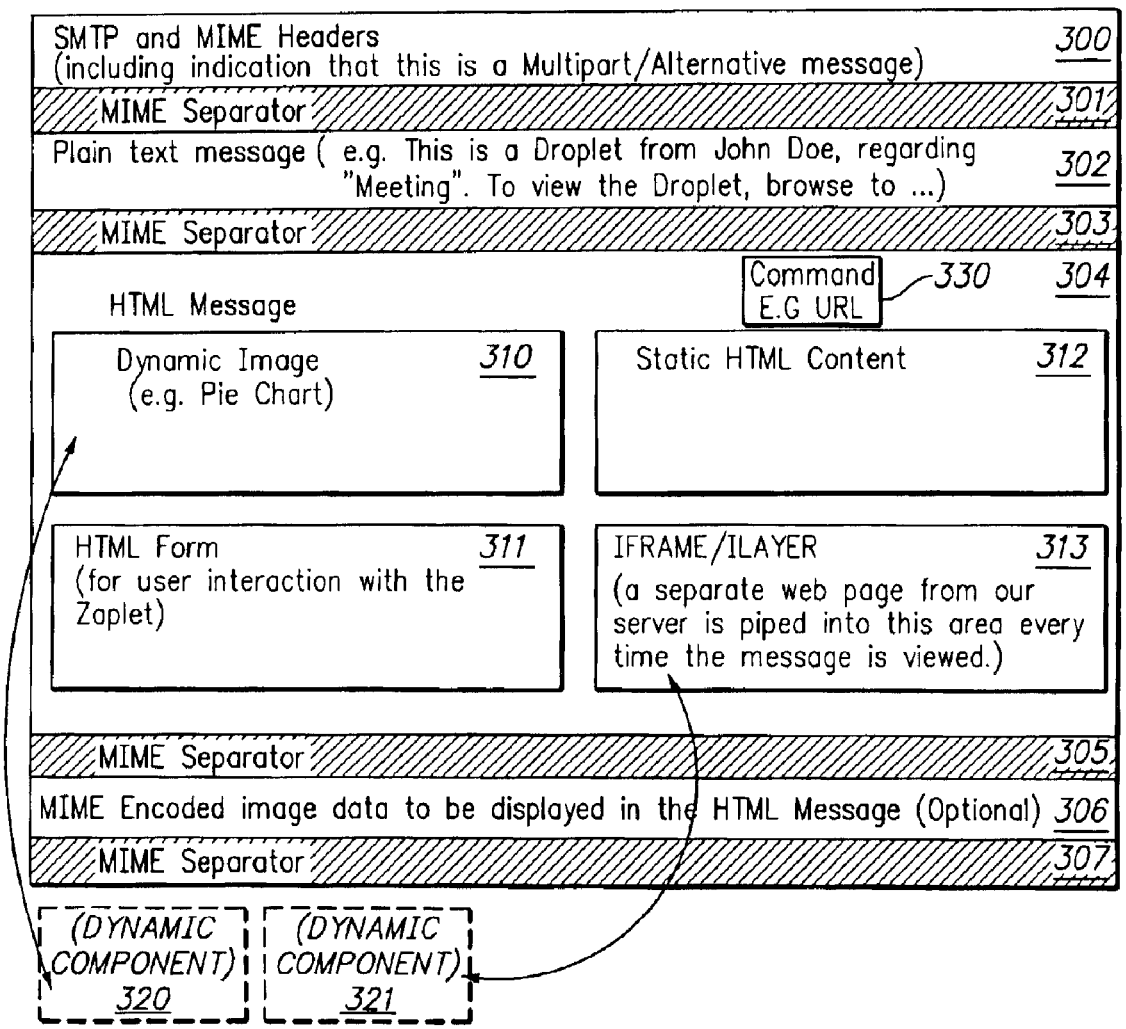
FIG. 4 is a diagram of a data structure for the zaplet having dynamic content.

FIG. 4 shows a suitable data structure for a zaplet process.

The data structure 350 can be based, for example, on HTML over SMTP using MIME. The data structure 200 includes SMTP and MIME headers 300. These headers 300 include an indication that the message is a multipart/alternative type according to the MIME standard. The multipart/alternative type specifies that the participant is configured to display one alternative format or content-type of the message selected from a segment 302 and a segment 304, depending on the capability of the software of the participant parsing the message.

The data structure 350 may define a transport envelope with region 300 containing a plurality of network addresses, such as the e-mail address of a sending and receiving participant. A MIME separator 301 may be inserted between headers 300 and segments 302 and also between segments 302 and 304.

The segment 302 may also include a plain text message that is displayed if the participant does not have the capability to display regions 310 and 313 of segment 304, described below, according to the multipart/alternative message type indicated in the headers 300. For example, the segment 302 can include a command instructing a participant that he or she may view a web page corresponding to the segment 304.

The segment 304 may include a rich text HTML document, including any number of dynamic regions 310, HTML forms 311, static HTML content regions 312, and IFRAME/ILAYER regions 313. The dynamic content region 310 can include a command to dynamic content 320 of the zaplet, stored remotely such as in the database 10 of the server 6 on the network 5. The IFRAME/ILAYER region 313 may include a command to access dynamic content 321 of the zaplet, stored remotely such as in the database 10 or at the server 6 on the network 5. The dynamic content 321 may be in the same location as the first dynamic content 320, or may be in a different location in database 10. Each dynamic content region 310 and 313 may have content that includes more than one dynamically updated construct or image.

The form 311 can be used to receive input from a participant, and the region 312 can be used to provide static information/processes that are independent of the current zaplet process.

The segment 304 may also include a region 330 that can be used to store a command indicating a web page storing the content of the segment 304. This configuration can be used when a participant attempts to forward the zaplet to another participant connected to a server that cannot support the segment 304. In this way, the participant can still view the content of segment 304, and is therefore not dropped from the group.

In FIG. 4, a MIME separator 305 is configured between the segment 304 and a segment 306.

The segment 306 can include MIME encoded image data to be displayed in the HTML message of segment 304. The image data may include images for logos or photos that can be accessed by the participant even if the server 6 is not accessible. The optional segment 306 is followed by a MIME separator 307.

The structure 350 can be used to provide a high quality of service to various classes of participants based upon their e-mail client application capabilities. Five classes of "e-mail clients" include new P.C. e-mail clients, web e-mail clients, older P.C. e-mail clients, text e-mail clients, and America On-Line ("AOL") e-mail clients. The functionality in the segment 304 is provided to new P.C. e-mail clients completely. Some web e-mail clients do not allow use of an IFRAME/ILAYER tag to display dynamic content 321 of the dynamic content region 313. In this case, the participant gets a static message directing the participant to a web representation, or a dynamic image displaying the same up-to-date data is served by the image server 28. Many older P.C. e-mail clients, and all of the text e-mail clients cannot display the segment 304. These participants may receive an e-mail message with static content, and a URL identifying a web page at which the dynamic content may be accessed. Current AOL clients support some of the HTML standard.

It has also been found that the server 6 can be configured to identify the capability of a participant. For example, the server 6 can be configured to automatically send the zaplet to the participant by recognizing the suffix "aol.com" in the participant's network address. Alternatively, the participant can specify which e-mail client to use by sending a request to the server 6.

Figure 5:
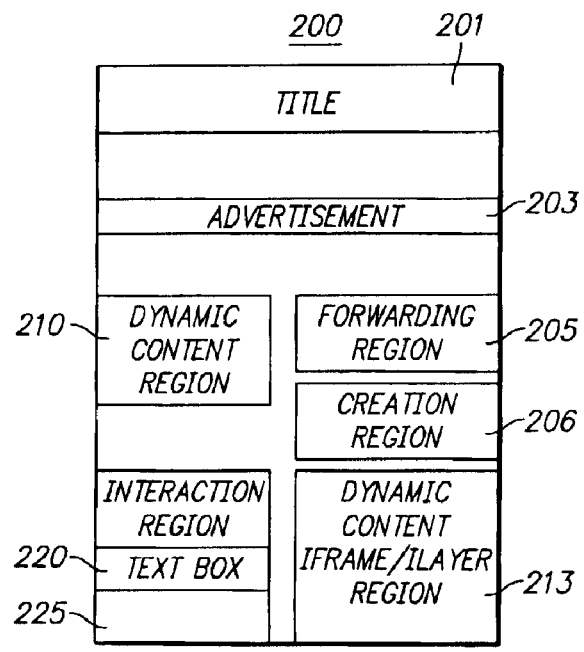
FIG. 5 is an example of an image of a zaplet.

FIG. 5 shows an example of an image of a zaplet 200 that is displayed to a participant when the data structure 350 is parsed. The zaplet may include a title field 201 that contains static content similar to the information inputted in fields 101, 102, 104, and 105. Preferably, the above static content is displayed each time the zaplet 200 is accessed by a participant. The zaplet 200 may also include an advertising region 203. The content in region 203 can be static or dynamic content. The content in regions 201 and 203 can be configured and supplied by the business logic in web application server 14.

The zaplet 200 also includes a forwarding region 205 and a creation region 206 corresponding to segment 312 of the data structure 350. The region 205 allows a participant to add an address of a potential participant that is not listed in the address field 103. This means that any participant listed in the address list of field 103 can include any other potential participants not listed in the field 103. In other configurations, the ability of a participant to add another participant can be controlled by the creating participant of the zaplet.

The creation region 206 is also included in zaplet 200 to allow a participant to create an electronic form similar to electronic form 100 to initiate another zaplet process.

The zaplet 200 also includes a dynamic content region 210 corresponding to segment 310 of data structure 350 that receives the dynamic content 320. In one configuration, region 210 may include a graphical image, such as a pie chart, or other binary content including executable content. The content 320 of the region 210 can be dynamically updated by the business logic residing in the web application server 14.

The zaplet 200 also includes an interaction region 225 corresponding to segment 312 of the data structure 350. The interaction region can include images, such as check boxes, to select options created using the electronic form 100. For example, a poll can be initiated in electronic form 100 and the interaction region 225 could contain boxes to select a poll choice. The interaction region also contains a text box 223 that allows a participant to add a text passage to the zaplet. The interaction region may also include the name of the responding participant and his or her associated e-mail address.

A dynamic content region 213 corresponding to region 313 of data structure 350 is contained in zaplet 200 that receives the content 321. The content 321 can include text passages that are entered by participants using the interaction region 225. The business logic at the web application server 14 manages the text passages and causes changes to the variables in database 10 to update the content 321 and to display the updated content in region 213, when the participant opens the message. The displayed content in region 213 may include visual images, a list of participants who have entered text passages, or any other relevant dynamic content.

Figure 6:
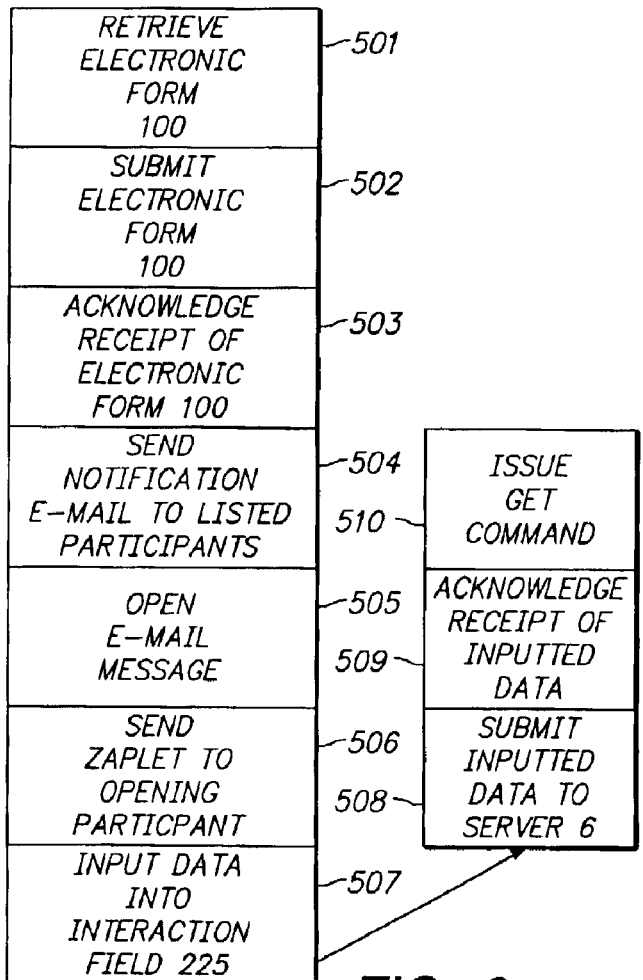
FIG. 6 is a flow chart illustrating a preferred method of the present invention.

FIG. 6 illustrates that initially one of the participants accesses a live electronic form 100 to begin a zaplet process (step 501). The requesting participant may access the form 100 from the database 10 via the web server 16, from a web site, or other resource as discussed above. To access the electronic form 100, the participant may specify a descriptor, such as a URL, associated with the electronic form 100. Once the electronic form 100 is displayed to the participant, the participant completes the fields 101, 102, 103, and 104. The participant may also complete field 105. The participant then submits the form to the server 6 (step 502).

Next, a confirmation message is sent from the web server 16 indicating that the content of the electronic form 100 was received, that the electronic form 100 was sent to the addresses listed in field 103, and any other errors associated with the processing of the electronic form 100 (step 503). Alternatively, the creating participant of the electronic form 100 may receive the e-mail message (step 504) described below as an acknowledgement that the form 100 was successfully received by the server 6.

Each of the participants in the list in field 103 receives an e-mail message associated with the zaplet (step 504) indicating that the zaplet process has been initiated. Next, a receiving participant opens the message (step 505). In one configuration, a receiving participant may be the creating participant. This mechanism could allow a creating participant to create a "personal" zaplet that only he or she could update or retrieve. Once the receiving participant opens the e-mail message, the dynamic content of the zaplet 200 is served essentially at viewing time to the display of the participant as follows (step 506).

Figure 7:
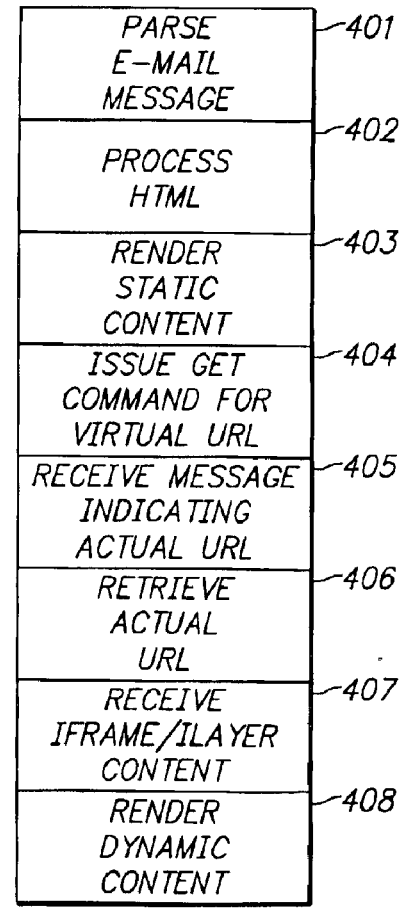
FIG. 7 is a flow chart illustrating a preferred method of accessing the zaplet by parsing the data structure of FIG. 4.

Referring to FIG. 7, the e-mail protocol residing at the participant begins by parsing the received e-mail according to the MIME and SMTP header and separators 300 (step 401). If the participant is capable of displaying the dynamic content of the zaplet in the segment 304, content is produced by parsing the HTML (step 402). The participant initially renders static components of the zaplet, such as in the regions 311 and 312 (step 403). To render the dynamic content in region 310, a parsing engine at the participant issues a get command using, for example, a virtual URL identified by a tag field in the HTML (step 404). The server 6 includes logic, such as business logic in web application server 14, to map the virtual URL to an actual URL for the dynamic content 320 of the dynamic content region 310, and returns a message indicating the actual URL for the dynamic content 320 corresponding to the virtual URL, which is received at the participant site (step 405). A get command for the actual URL is then issued (step 406). A web page indicated by the IFRAME/ILAYER region 313 of the data structure 350 can also be retrieved similar to steps 404–406 (step 407), and then the dynamic content 321 for the dynamic content region 313 is rendered (step 408).

Referring again to FIG. 6, once the zaplet 200 is retrieved by the participant, he or she inputs data into the interaction region 225 (step 507). For example, the user may input a text passage. At this stage, the dynamic content region 213 will include concatenated text messages and a list of message recipients as discussed above. The participant then submits the updated zaplet to the server 6 (step 508). Next, the submitting participant receives an acknowledgement from the web server 16 indicating that the zaplet was received (step 509). The e-mail protocol residing at the client may then issue at any time a new get command for the dynamic content in region 310 and/or region 313 to display the updated images and/or text content in the dynamic content regions 210 and 213 (step 510). Alternatively, after the participant submits his or her input (step 508), another instance of the zaplet could be served that includes the above acknowledgement, and also reflects the most recent dynamic content including the submission at step 508. In another configuration, the dynamic content of the zaplet could be updated "in-place". This means that the regions 210 and 213 could be updated to reflect the most recent content in the server 6 including the submission at step 508, as the participant is viewing the zaplet. Subsequent actions by any of the participants of the group to open a message will result in the display of the updated images and text content in the zaplet 200.

Participants collaborate efficiently. Each participant can send and receive information that is current using dynamic regions 210 and 213. This means that participants can accurately respond or opine to a zaplet process with the most current information at their disposal.

Privacy in communications in supported because the dynamic content can be restricted to those specified in field 103. Further, content may be dynamically updated asynchronously relative to the sending of the documents or forms and asynchronously relative to any processes used by any other participants parsing the electronic messages. In this way, the zaplets received by participants of the group do not become stale or outdated. Additionally, the updated content includes dynamic information identifying changes that have occurred since the message was last viewed by the viewing participant. This means that the viewing participant can track the opinions, suggestions, or other comments made by other participants in a simple and quick manner. The preferred method also allows participants to interact with other participants in a group without the daunting task of "surfing" the Web to find the discussion management tool that manages the discussion. The highest quality service based upon the participant's e-mail application capabilities are also provided. A zaplet 200 generally passes through states from the instant that the initiating participant (e.g., author) starts defining the electronic form 100 until the zaplet 200 is discarded or deleted. A state can be defined by the behavior of the zaplet 200 and operations available to the author or recipient of the zaplet 200. This means that the zaplet 200 can 15 change states numerous times. Tracking and managing such states may be important to conserve network resources and provide enhanced flexibility to a participant.

FIGS. 8–19 describe various processes for tracking or managing zaplets 200. The processes may be applied to one or more portions or types of content of the zaplet.

Figure 8:
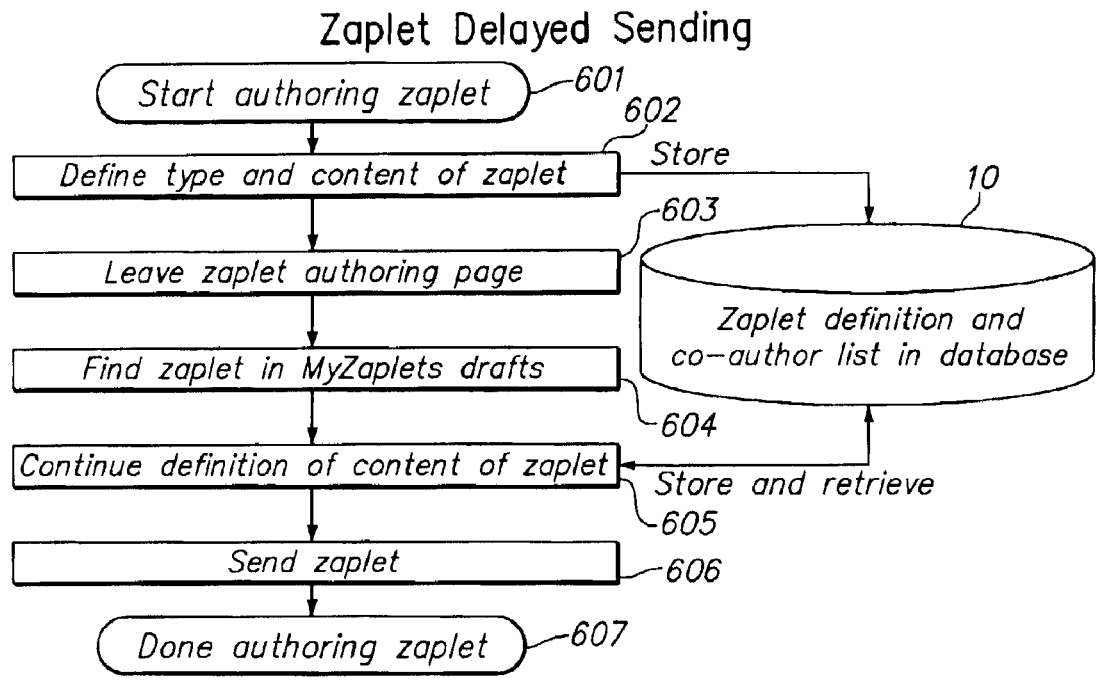
FIG. 8 illustrates a flow chart describing a process for delayed sending of a zaplet.

FIG. 8 illustrates a flow chart describing a process for delayed sending of a zaplet. This process enables a participant to begin creating the zaplet 200 by completing an electronic form 100 (Step 601), as described above. The electronic form 100, however, may not be completed at Step 601. Accordingly, a partially completed electronic form 100 may be stored in the database 10 or in a local folder (Step 602). Thereafter, the initiating participant may exit, for example, a web site (Step 603). The initiating participant may then access the partially completed electronic form 100 from the database 10 (Step 605) or from a folder e.g. "MyZaplets" folder (Step 604). The electronic form 100 may subsequently be completed (Step 605) and then sent to server 6 (Step 606) and processed, as described above. Finally, the initiating participant completes the authoring process (Step 607).

Figure 9:
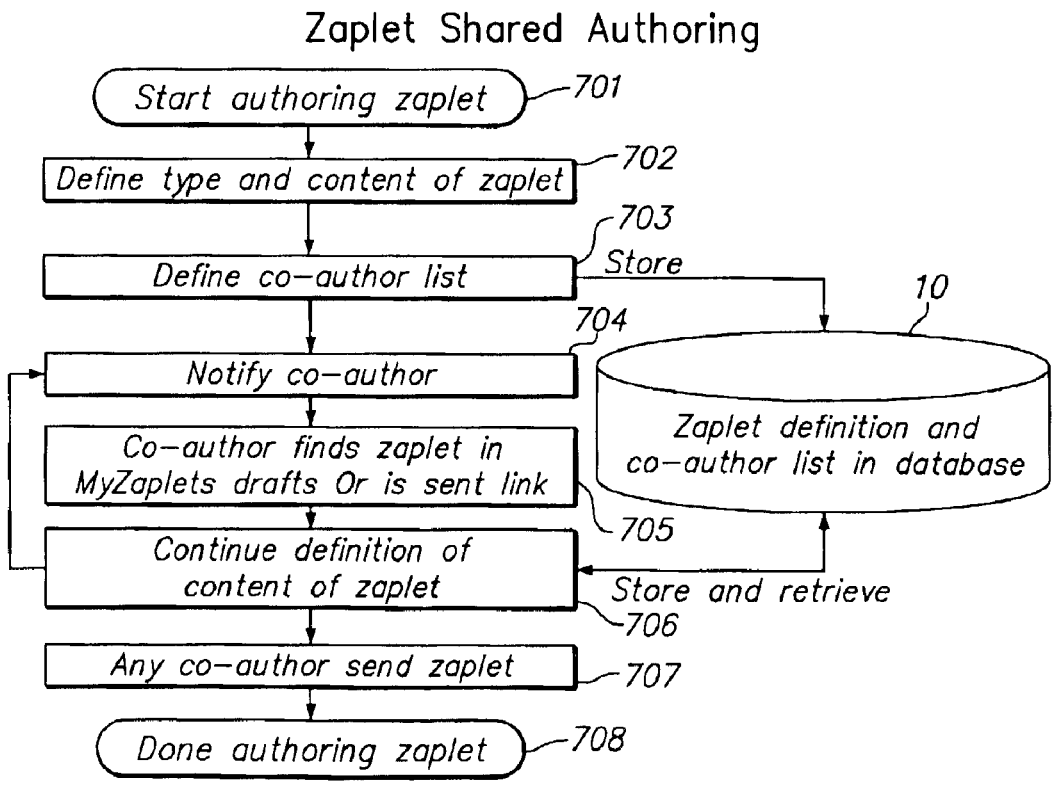
FIG. 9 illustrates a flow chart describing a process for shared authoring of a zaplet.

FIG. 9 illustrates a flow chart describing a process for shared authoring of a zaplet. This process allows multiple participants to create a zaplet 200 by completing an electronic form 100 (Step 701), as described above. The electronic form 100, however, may not be completed at Step 701. After the electronic form 100 is partially completed (Step 702), the initiating participant may define a co-author list to add other participants to author the electronic form 100 (Step 703). The partially completed electronic form 100 and the coauthor list may be stored in the database 10 or in a local folder (Step 703). Thereafter, the initiating participant may notify the other listed participants of the ability to author the electronic form 100 (Step 704). Alternatively, the server 6 may notify the other listed participants. The other listed participants may then access the partially completed electronic form 100 from the database 10 (Step 706), from a folder e.g., "MyZaplet drafts" folder (Step 705), or a link may be sent to allow the participant to access the form 100. The other participants may then add to the electronic form 100 (Step 706), which is then sent to server 6 (Step 707) and processed, as described above. At Step 706, other participants can be notified and the process repeats from Step 704, until the electronic form 100 is completed. Finally, the authoring process is finished (Step 708).

Figure 10:
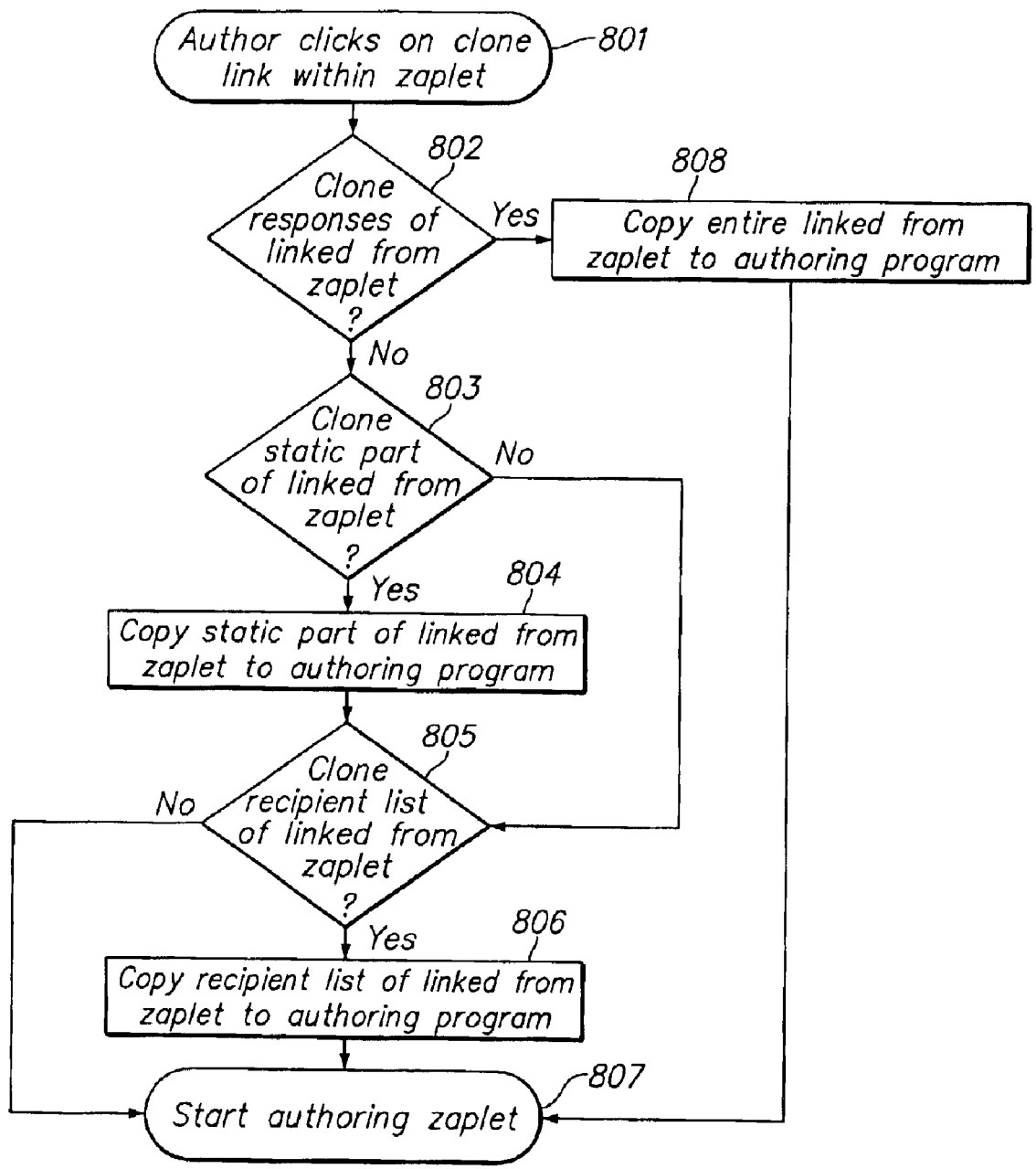
FIG. 10 illustrates a flow chart describing a process for copying a zaplet.

FIG. 10 illustrates a flow chart describing a process for cloning a zaplet. This process allows a participant to copy or clone one or more portions of a zaplet. This leads to quick and efficient initiation or creation of a zaplet. An initiating participant can clone an existing zaplet 200 by using its static content, dynamic content, and/or network address list to generate a new zaplet. Initially, an initiating participant may select a button or link within an existing zaplet 200 to generate a new zaplet (Step 801). The initiating participant is then prompted to copy or clone the responses or content in regions 310 and/or 313 (Step 802). If Step 802 is executed, the information is copied (808) and sent to the server 6 to initiate a new authoring process e.g., to create a new electronic form 100 (Step 807). If Step 802 is not executed, the initiating participant is prompted to clone or copy the content from an electronic form 100 used to create the zaplet 200 (Step 803). If Step 803 is executed, the content of the electronic form 100 is copied and sent to the server 6 (Step 804). After Step 804 or if Step 803 is not executed, the initiating participant is prompted to clone the network address list of the zaplet 200 (Step 805). If Step 805 is executed, the network address list is copied and sent to the server 6 (Step 806). If Step 805 is not executed, the authoring process is executed at Step 807.

Figure 11:
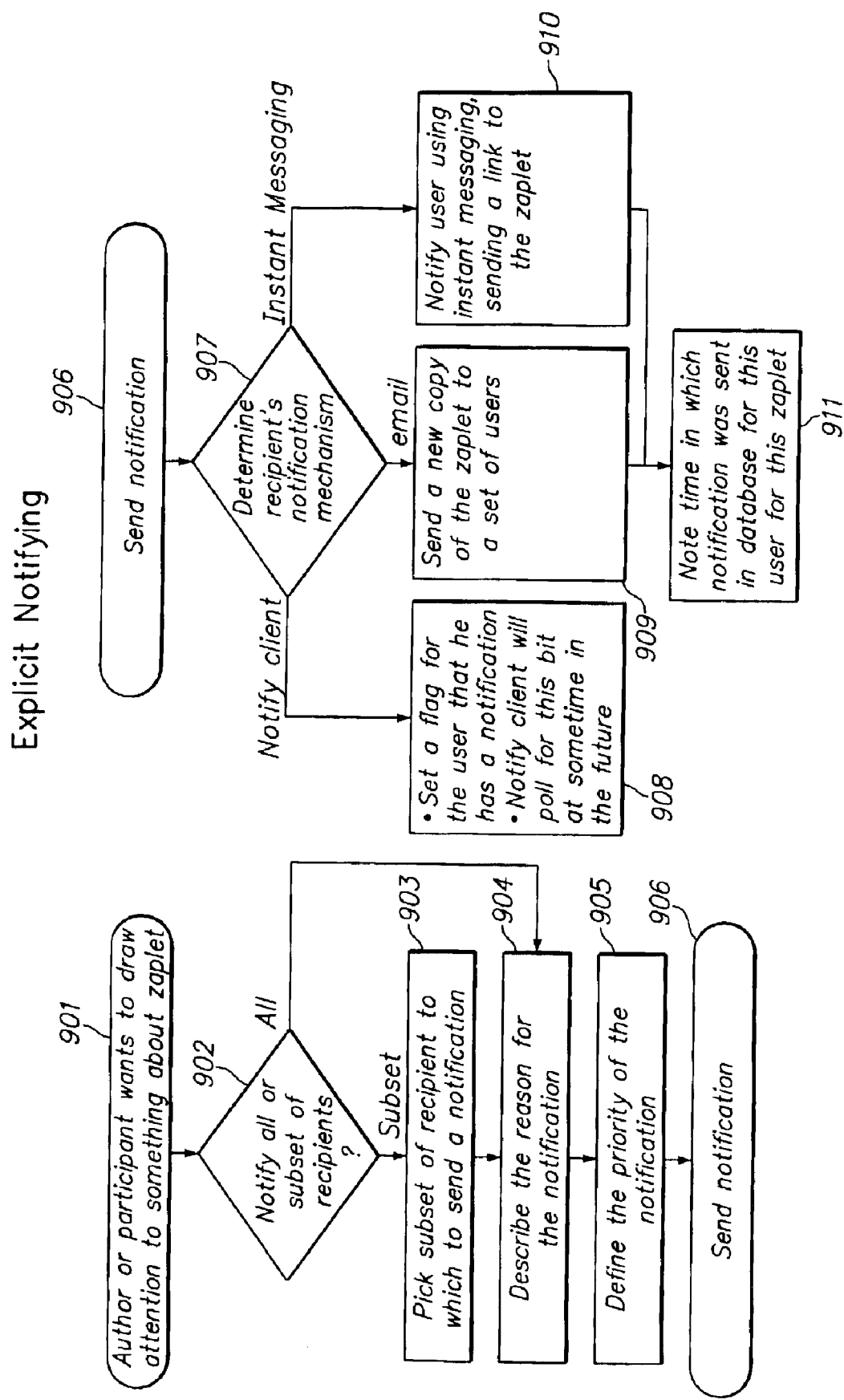
FIG. 11 illustrates a flow chart describing a process for notifying a participant of a zaplet.

FIG. 11 illustrates a flow chart describing a process for notifying a participant of a zaplet. This process allows in initiating participant or other participants to notify others of changes to the zaplet 200 (Step 901). The participant may then select to identify all or some of the participants (Step 902). If all of the participants are selected, the participant describes the reason for the notification (Step 904). The reason may also be automatically discernible by configuring the business logic described above. If a subset of the participants is selected it Step 902, the participant selects a subset from, for example, the network address list of field 103 (Step 903). Then, Step 904 is executed. The notification can also be prioritized (Step 905). The notification is then sent by the server 6 (Step 906). The server determines the type of notification required by the participant (Step 907). For a client, a flag may be set in server 6 which may be polled for by the participant at some time interval and the content of the notification retrieved from server 6 (Step 908). For participants using e-mail, a new copy of the zaplet may be sent which also contains the description and priority of the notification (Step 909). Alternatively, a participant equipped with a facsimile machine may receive a new copy or version of the zaplet. A link may be sent to participants equipped with instant messaging (Step 910). A link may also be sent to a pager, PDA, or other similar computing device. A time stamp for the notification may be stored in database 10 for participants equipped with instant messaging and/or e-mail. A suitable time stamp mechanism is described at step 1210 below.

Figure 12:
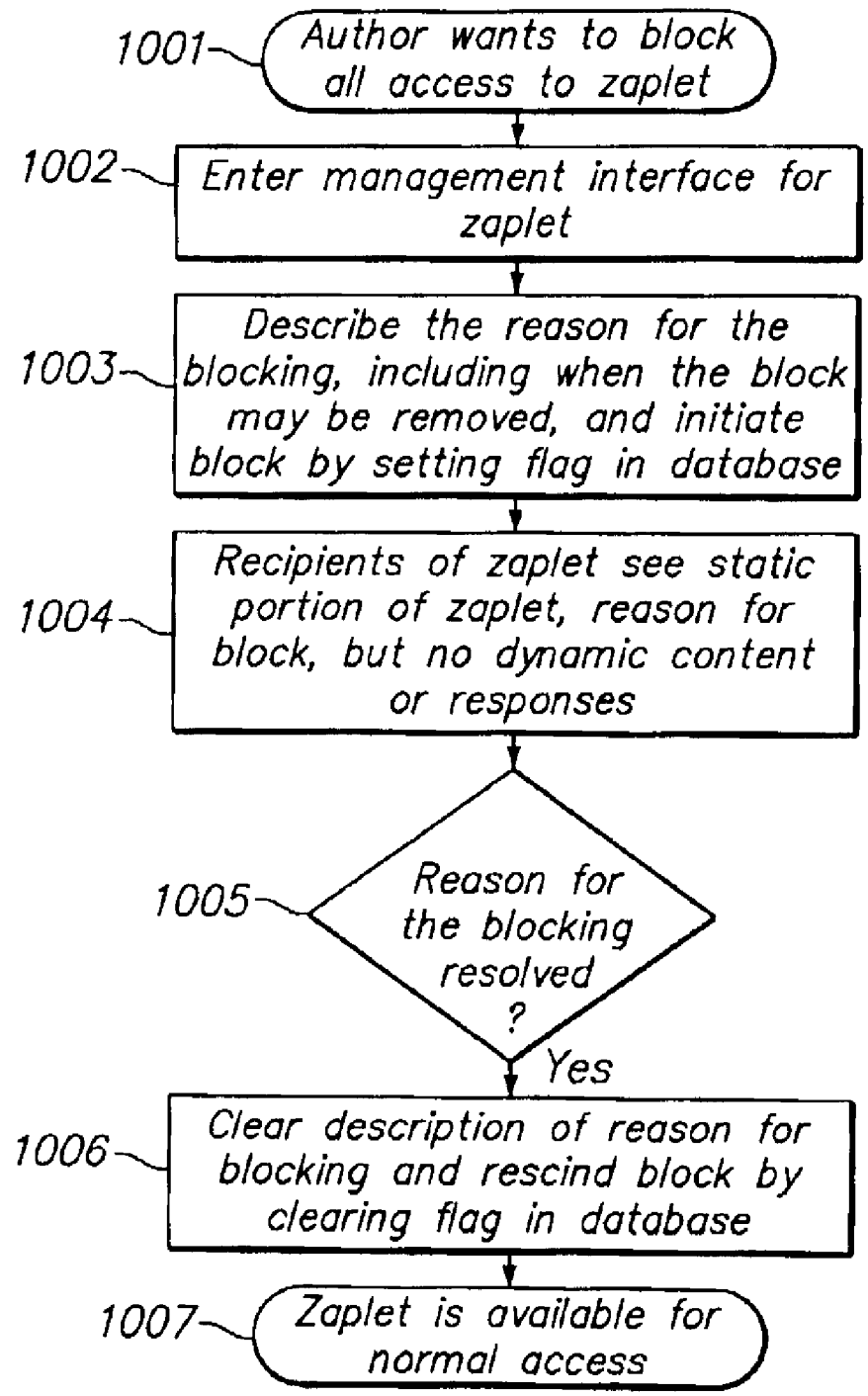
FIG. 12 illustrates a flow chart describing a process for blocking access to a zaplet.

FIG. 12 illustrates a flow chart describing a process for blocking access to a zaplet.

This process allows a participant to temporarily block other participants from reading the dynamic content of a zaplet 200 or responding to a zaplet 200. The participant initiates a command to block access to the zaplet (Step 1001). Next, the participant enters the management interface for this zaplet, which is located, for example, in the server 6 (Step 1002). The participant then sets a flag in the database 10 and describes the reason for the blocking (Step 1003). In one example, the participant may block access to the dynamic content in regions 310, 313. Thus, the other participants only receive the static content and the reason for the block (Step 1004). Once the reason for the block is resolved (Step 1005), the description for the block is deleted and the flag is cleared in the database 10 (Step 1006). The zaplet is then available for normal access (Step 1007).

Figure 13:
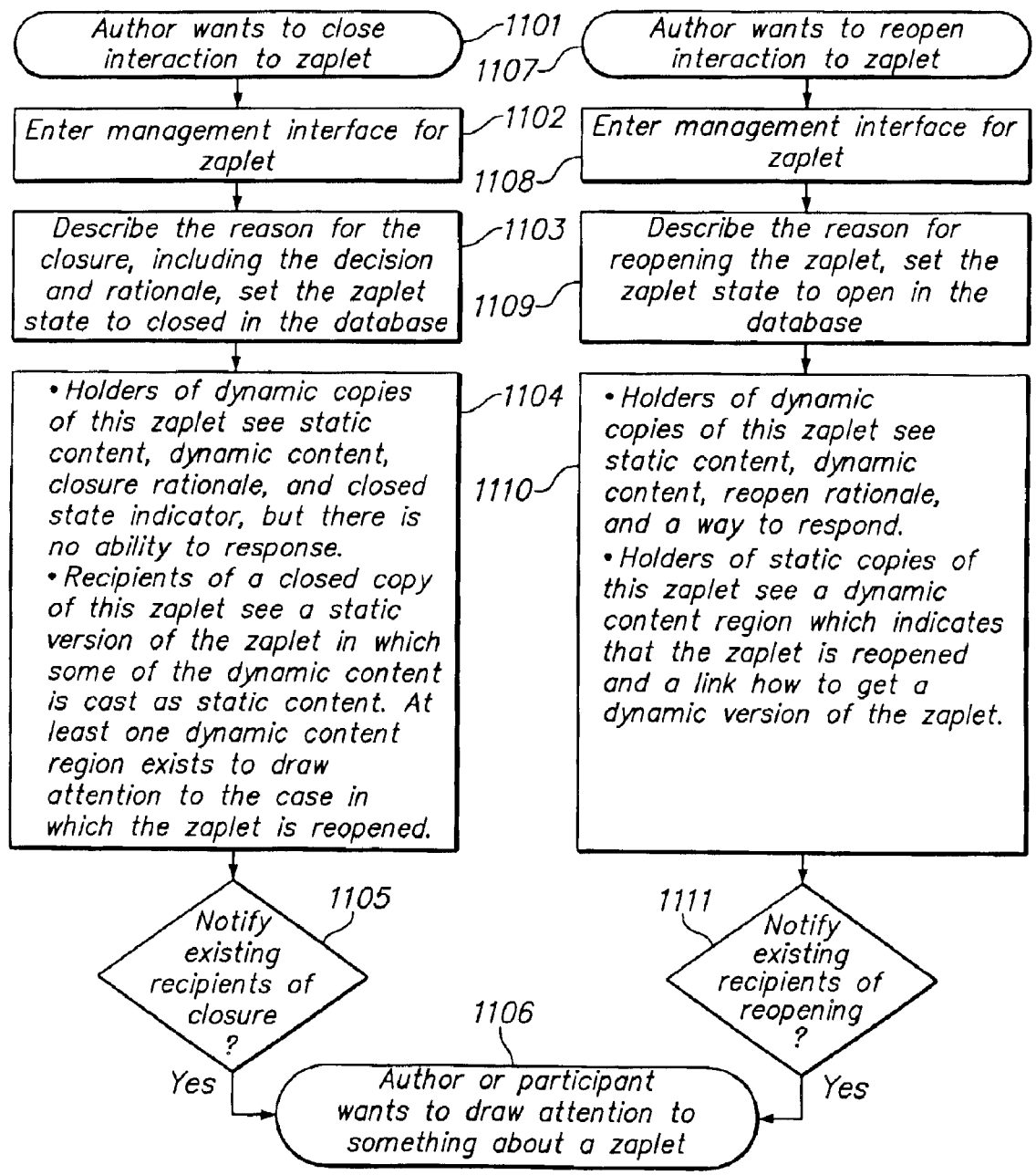
FIG. 13 illustrates a flow chart describing a process for controlling responses to a zaplet.

FIG. 13 illustrates a flow chart describing a process for controlling responses to a zaplet. This allows an initiating participant to prevent or to allow other participants to respond to a zaplet 200. First, the initiating participant is asked or asks to close interaction to the zaplet 200 (Step 1101). The initiating participant then enters the management interface similar to Step 1002 above (Step 1102). The initiating participant then specifies the reason for the closure and sets a state of the zaplet 200 in the database 10 (Step 1103). The receiving participants with a current version of the zaplet 200 see the static content, the dynamic content, a closed state indicator, and the reason for the closure (Step 1104). The receiving participants are not permitted to respond to the zaplet. The participants receiving a prior closed zaplet 200 may see the static content, some of the dynamic content is cast as static content, and at least one dynamic content region 310, 313 exists to deliver dynamic content, if the zaplet is re-opened (Step 1104). The participants are then notified of the closure directly by the initiating participant or by the server 6 (Step 1145). The initiating participant has then drawn attention to the fact that the zaplet 200 is closed (Step 1106).

A closed zaplet may be re-opened for further processing or interaction. To re-open the zaplet 200, the initiating participant begins the re-opening procedure (Step 1107). Step 1108 is then executed similar to Step 1102 above. Next, the reason for opening may be described and the state of the zaplet is set to open in the database 10 (Step 1109). The receiving participants with a current version of the zaplet 200 see the dynamic content, the static content, optionally an open state indicator, and optionally the reason for the opening (Step 1110). The participants are permitted to respond to the zaplet. The participants receiving a prior closed zaplet 200 see the static content and at least one dynamic content region 310, 313 exists to deliver dynamic content, or a link to the dynamic content, when the zaplet is opened (Step 1110). Instructions may be sent to retrieve the dynamic content. The participants are then notified of the opening directly by the initiating participant or by the server 6 (Step 1111). The initiating participant has then drawn attention to the fact that the zaplet 200 is re-opened (Step 1106).

A participant may be notified of changes to zaplets of special interest. The notifications may be timed to avoid sending a notification for every change. In one embodiment, a notification for every change is avoided by sending notifications based upon knowledge of when a participant has viewed any previous version of the zaplet.

Figure 14:
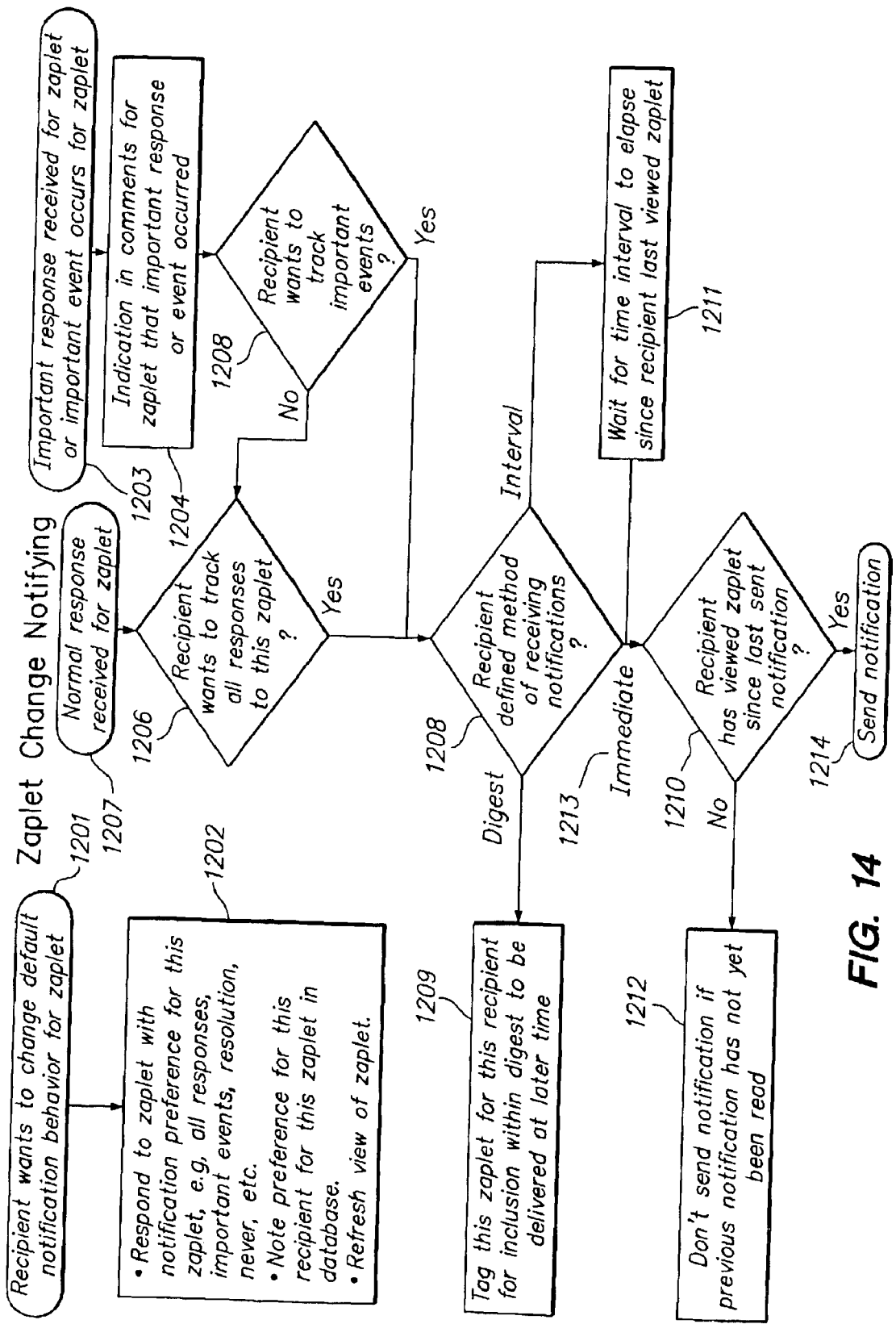
FIG. 14 illustrates a flow chart describing a process for notifying participants of changes to a zaplet.

FIG. 14 illustrates a flow chart describing a process for notifying participants of changes to a zaplet. In one embodiment, the participant may desire to change a default notification for the zaplet 200 (Step 1201). The participant responds to receiving the zaplet with notification preferences e.g., all responses, important events, resolution of the zaplet, no interest in special notification, or no responses. The preferences for this participant may be stored in the database 10, and the zaplet may then be dynamically updated to indicate the preference of this notification state (Step 1202).

In one example, an important response is received or an important event occurs within a zaplet 200 and may be recorded within and displayed within a zaplet 200 (Steps 1203–1204). A check is made to see if the participant has previously decided whether to track the important events or responses (Step 1205). If no, a check is made to see if the participant has previously asked to track all responses (Step 1206). Similarly, a normal response occurring in a zaplet 200 (Step 1207) executes Step 1206. If the answer is yes at Step 1205 or Step 1206 when executed, the participant's chosen method for receiving the notifications is determined (Step 1208). The participant may choose "Digest" (Step 1209), "Immediate" (Step 1213), or "Interval" (Step 1211). Digest allows a participant to tag the zaplet 200 to be delivered at a later time. This can be accomplished within a zaplet 200 containing a list of other zaplets. Interval permits a time interval specified by the participant to elapse since the recipient last accessed the zaplet 200 before sending a notification. If Immediate or Interval is selected, the server 6 determines whether the participant has viewed the zaplet 200 since the most recent notification has been sent (Step 1210). If no, the notification is not sent. This is because the participant may view new content that is part of this current notification, when as previous notification is opened (Step 1212). On the other hand, if all prior notifications have been viewed, the notification is sent by the server 6 (Step 1214).

Figure 15:
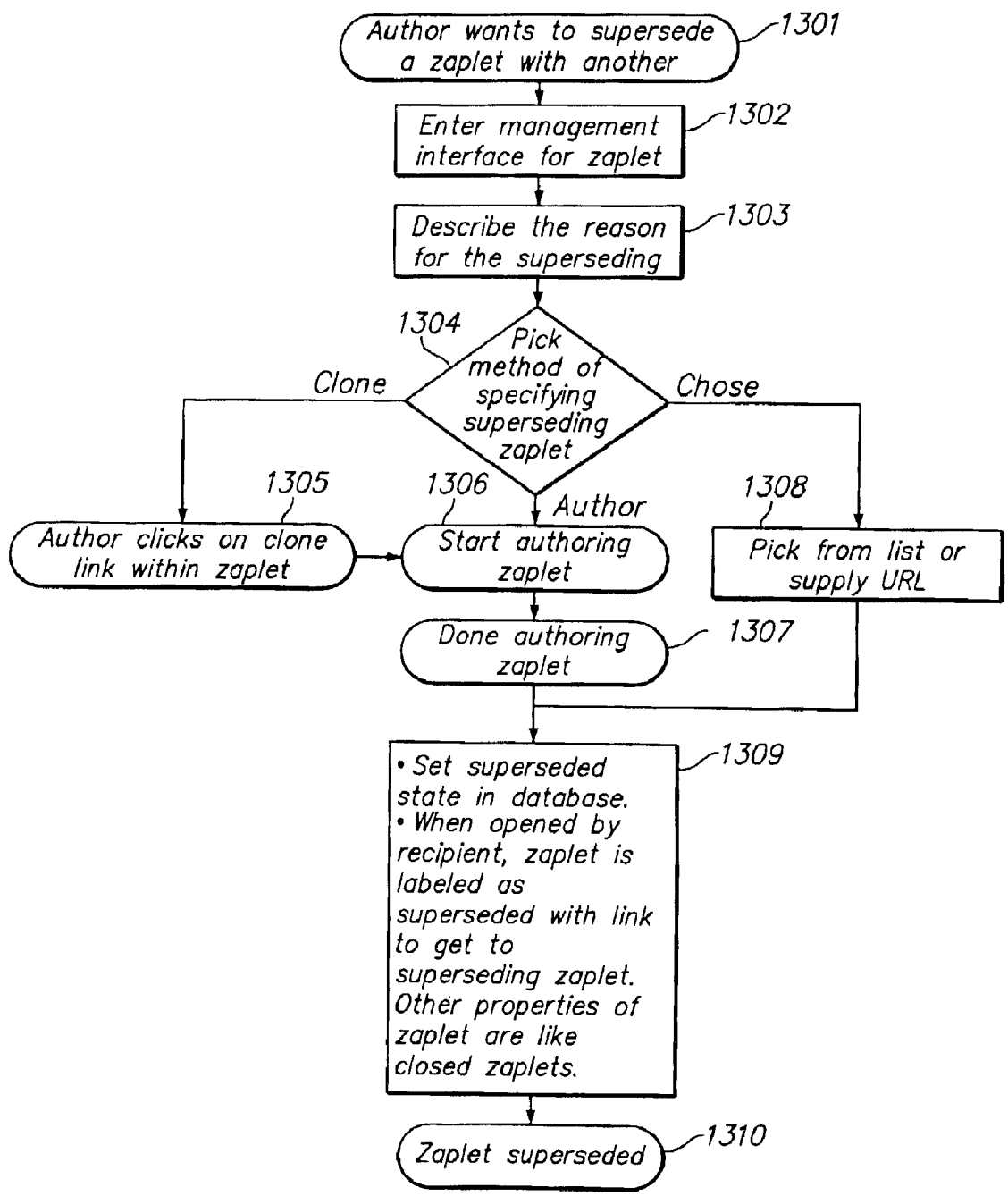
FIG. 15 illustrates a flow chart describing a process for superseding a zaplet.

FIG. 15 illustrates a flow chart describing a process for superseding a zaplet. This process allows an initiating participant to supersede a zaplet 200 with a different zaplet. This may be due to an initiating participant having made an error in the static portion of the superseded zaplet. Initially, the initiating participant invokes a command to supersede an existing zaplet (Step 1301). The participant then enters the management interface similar to Step 1102 above (Step 1302). The initiating participant specifies the reason for the superseding (Step 1303) and then selects a method for the superseding (Step 1304). The participant may clone the zaplet (Step 1305), as described above in FIG. 10. In this case, the authoring process is started (Step 1306) and finished (Step 1307) by the participant and the server 6. Alternatively, the initiating participant can choose from a list of zaplets or provide a URL to that represents a zaplet 200 to replace the current zaplet 200 (Step 1308). Next, the state of the current zaplet as superseded is set in the database 10. The server 6 is configured to label the current zaplet 200 superseded, to describe the reason that the zaplet 200 has been superseded, to prevent further interaction with the superseded zaplet 200, and also provide a links to the new zaplet (Step 1309). The zaplet is then superseded (Step 1310).

Figure 16:
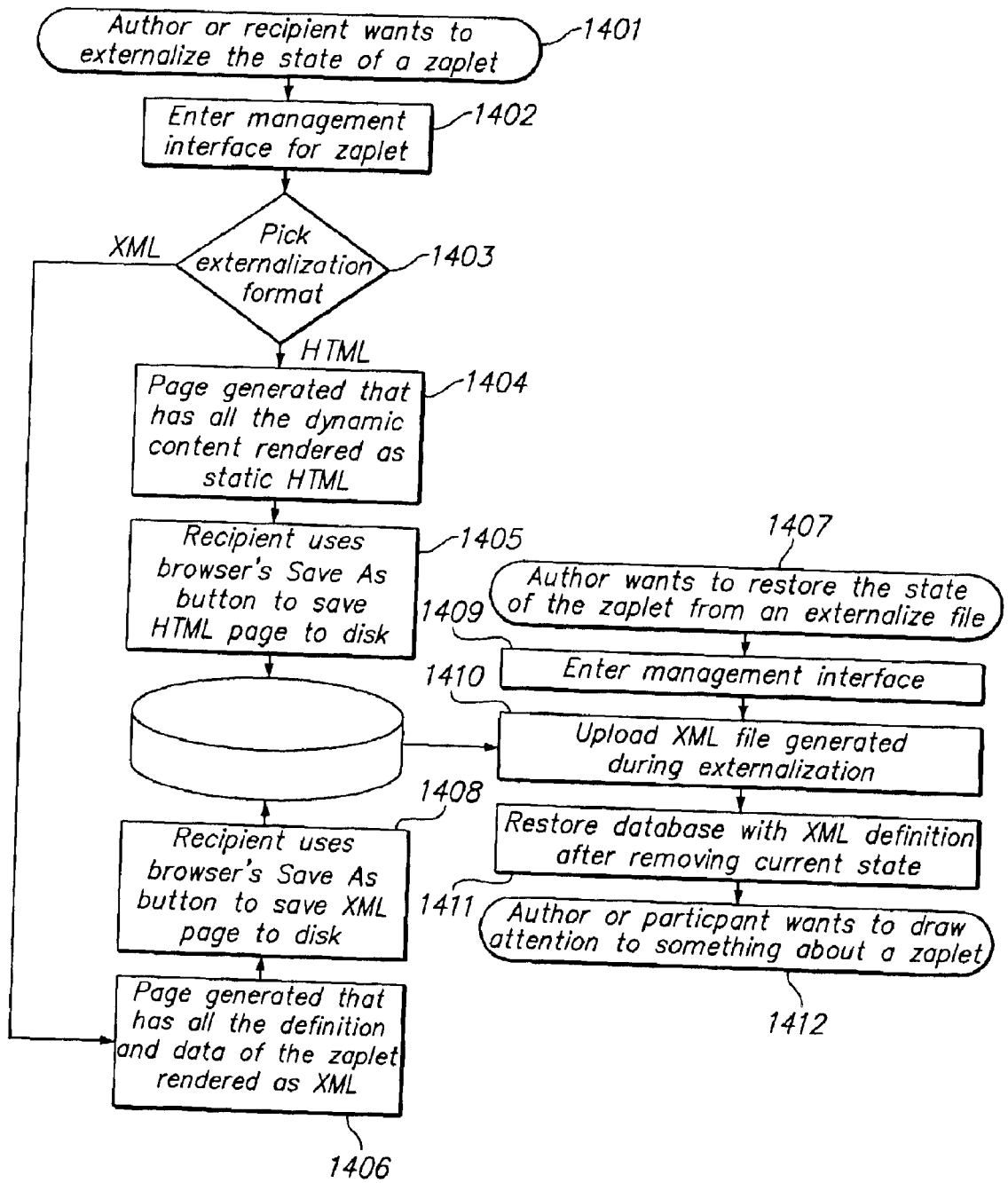
FIG. 16 illustrates a flow chart describing a process for externalizing or restoring a zaplet.

FIG. 16 illustrates a flow chart describing a process for externalizing or restoring a zaplet. The participant can externalize the state of a zaplet. The participant first asks to externalize the state of the zaplet 200 (Step 1401). Next, the participant enters the management interface similar to Step 1102 above (Step 1402). The participant may then pick an externalization format (Step 1403). For example, the participant may choose HTML. In this case, a page with dynamic content is rendered as static HTML (Step 1404). Thereafter, the participant may save the page to disk or the database 10 (Step 1405).

Alternatively, the participant may choose XML at Step 1403. A page is then generated that has definition and data of the zaplet rendered as XML (Step 1406). The participant may then save the page to disk or the database 10 (Step 1408). Other formats of externalized zaplets may be used.

To restore a zaplet, the participant is first prompted (Step 1407). The participant then enters the management interface similar to Step 1102 above (Step 1409). Subsequently, the XML definition is uploaded from the database 10 or disk (Step 1410). The current state of the zaplet represented by the XML definition is then restored within server 6 and database 10 (Step 1411). The participant may then draw special attention to the zaplet using a notification mechanism similar to that described above (Step 1412). Other formats of externalized zaplets may be used.

Figure 17:
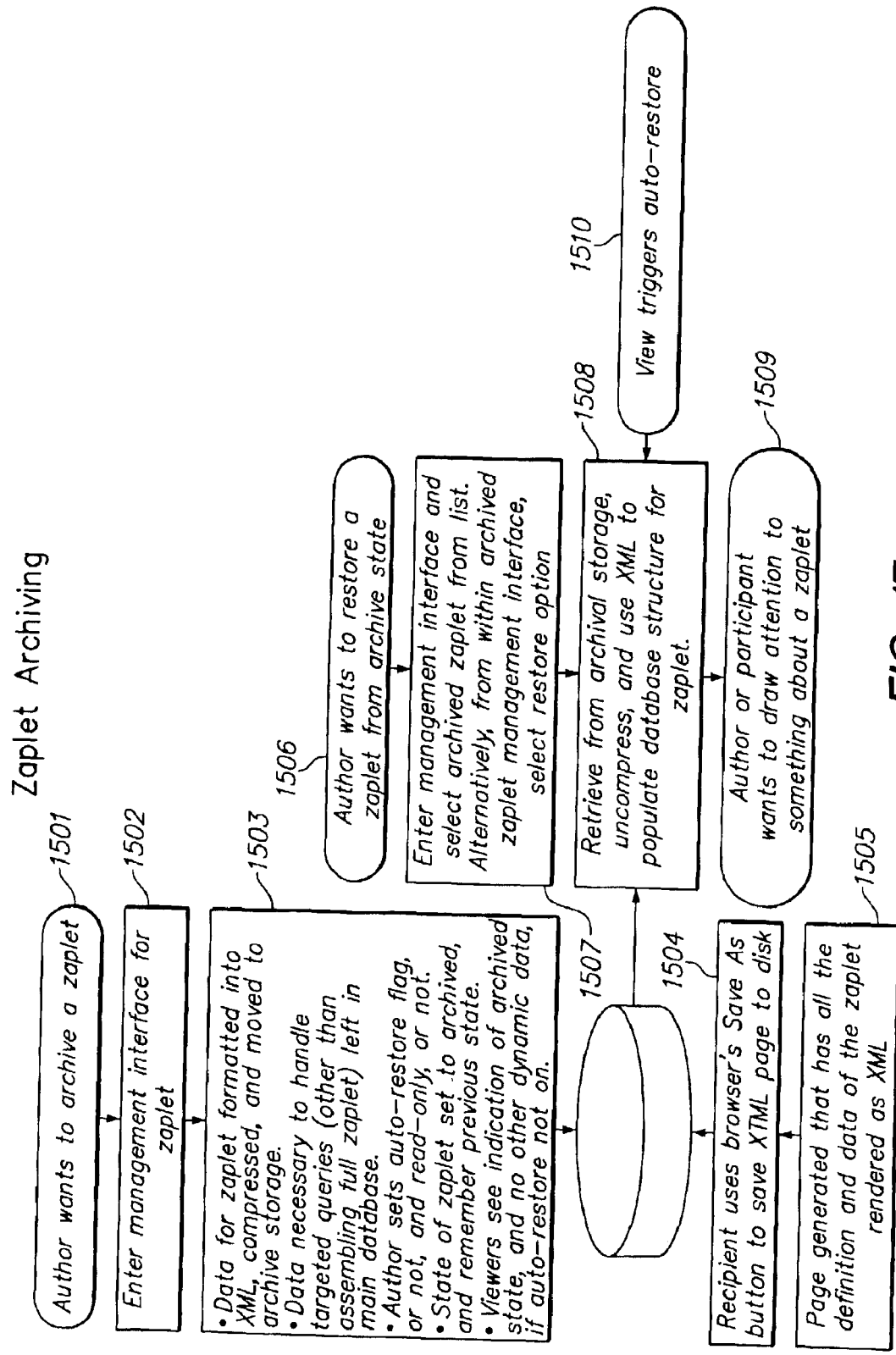
FIG. 17 illustrates a flow chart describing a process for archiving a zaplet.

FIG. 17 illustrates a flow chart describing a process for archiving a zaplet. The participant is first prompted to archive the zaplet 200 (Step 1501). Next, the participant enters the management interface similar to Step 1102 above (Step 1502). Data may be formatted, compressed and moved into an archived storage in database 10 or another database. Information may also be split between multiple databases. The participant also sets an auto-restore flag or a read-only flag in the database 10. A reason for the archival may also be set. A state of the zaplet is set to archived and a prior state of the zaplet 200 is also stored. Moreover, participants may only be able to view the indication of the archived state and may also be able to view one or more portions of the non-archived content. Archived content may be viewed if the auto-restore flag is set to "on." (Step 1503). The participant may also externalize the zaplet similar to Steps 1406 and 1408 above (Step 1504 and Step 1505). This creates a snapshot of the state of a zaplet 200 without changing the status of the zaplet.

To restore an archived zaplet, the participant is first prompted (Step 1506). Next, the participant enters a management interface similar to Step 1102 above and then selects the archived zaplet from a list in database 10 (Step 1507). The selected zaplet is retrieved from the database, the compressed data is uncompressed, and XML or other suitable format is used to populate the database structure to regenerate the zaplet to an original state (Step 1508). Optionally, the auto-restore tags may be monitored (Step 1510). The participant may then draw special attention to the zaplet as described above (Step 1509).

Figure 18:
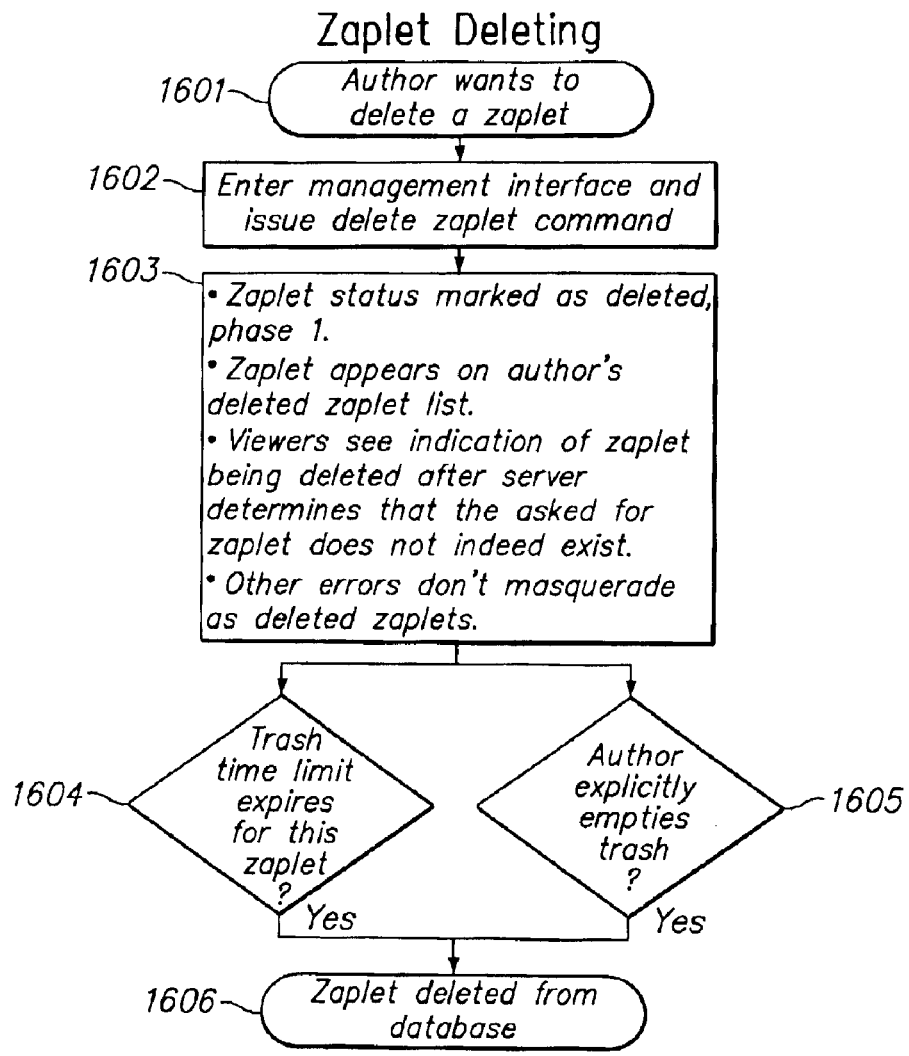
FIG. 18 illustrates a flow chart describing a process for deleting a zaplet.

FIG. 18 illustrates a flow chart describing a process for permanently deleting a zaplet. Initially, the initiating participant is prompted to delete the zaplet (Step 1601). Then, the participant enters the management interface as described in Step 1102 (Step 1602). Next, the zaplet is marked as deleted and the deleted zaplet may appear on the participant's "deleted" list. Other participants may be notified of the delete status once the server confirms this state (Step 1603). The participant may explicitly finish deleting the zaplet (Step 1605) or have the zaplet lapse over time (Step 1604). The zaplet is ultimately removed from the database 10 (Step 1606). Other participants may also delete their own individual copies of the zaplet without affecting other copies of the zaplet stored in the database 10.

Figure 19:
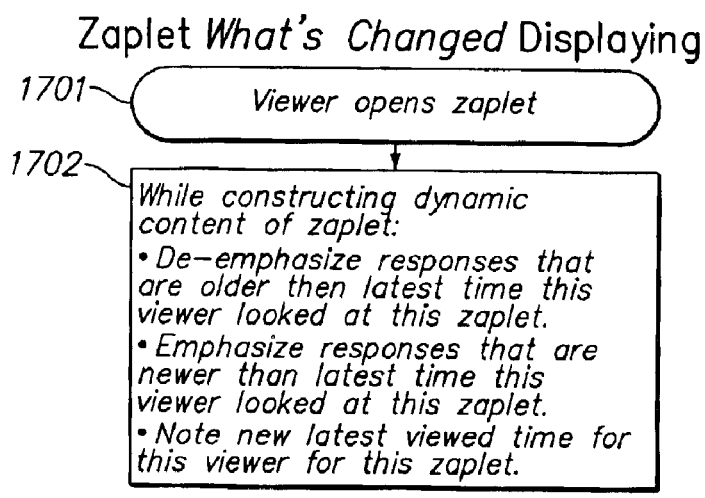
FIG. 19 illustrates a flow chart describing a process for displaying changes in content of a zaplet.

Changes that have been previously viewed may optionally be de-emphasized using certain rendering techniques in favor of those to be viewed. Suitable rendering techniques may be based on color, font, face, graphics, size, saturation, and position. In one example, as shown in FIG. 19, the participant opens the zaplet (Step 1701). While constructing the dynamic content of the zaplet 200 (Step 1702), newer responses to the zaplet 200 can be highlighted, while older responses can be de-emphasized. The time of the responses can also be tracked to determine which content has been previously viewed.

The methods and mechanisms described here are not limited to any particular hardware or software configuration, or to any particular communications modality, but rather they may find applicability in any communications or computer network environment.

The techniques described here may be implemented in hardware or software, or a combination of the two. Preferably, the techniques are implemented in computer programs executing one or more programmable computers that each includes a processor, a storage medium readable by the processor (including volatile and non-volatile memory and/or storage elements), and suitable input and output devices. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

A number of embodiments of the present invention have been described. Nevertheless, it will be understood that various modifications may be made without departing from the spirit and scope of the invention.

What is claimed is:

1. A method of automatically communicating a notification in response to an interaction with a dynamically updated electronic medium, comprising the computer-implemented steps of:

receiving a configuration of business logic of an electronic medium, wherein the electronic medium is transportable by electronic mail to one or more participants;

receiving user information identifying one or more participants for receiving notifications relating to changes in the electronic medium;

sending the electronic medium to one or more participants by electronic mail;

receiving input from one of at least one participant and an external source, wherein the input represents one or more changes to the electronic medium;

asynchronously dynamically updating and retrieving content for the electronic medium in response to the input from one of at least one participant and an external source;

receiving a reason for notification from the business logic based on the input; and sending a notification to the participants identified in the user information in response to the occurrence of the dynamic update and retrieval of the content.

2. The method of claim 1, wherein the content is one of XML and HTML.

3. The method of claim 1, wherein the step of sending a notification further comprises rendering a portion of the content to be different from other portions of the content.

4. The method of claim 1, wherein the step of sending the notification further comprises sending the notification to selected ones of a plurality of participants.

5. The method of claim 1 wherein the step of sending the notification further comprises setting a flag indicating an occurrence of the notification.

6. The method of claim 1 wherein the step of sending the notification further comprises sending the notification to at least one participant configured with one of a client, an instant messenger, and electronic mail.

7. The method of claim 1 wherein the step of sending the notification further comprises providing the reason for the notification in the notification.

8. The method of claim 1 wherein the step of sending the notification further comprises defining a priority for the notification.

9. The method of claim 1 wherein the step of sending of the notification further comprises determining a type of notification required by at least one participant receiving the notification.

10. The method of claim 9 wherein the step of determining the type of notification further comprises one of sending a link to the electronic medium, sending an updated version of the electronic medium, and polling to indicate the sending of the notification.

11. The method of claim 1 further comprising the step of receiving information identifying a reason for the notification as part of an electronic medium authoring process that includes the step of receiving the configuration of business logic.

12. A method as recited in claim 1, further comprising the steps of:
 setting a flag that is associated with the electronic medium and that specifies that a notification is present;
 receiving a poll from one or more of the participants;
 providing the notification in response to the poll when the flag is set.

13. The method of claim 1, further comprising the steps of:
 receiving a notification preference associated with a selected one of the participants;
 determining whether the input satisfies the notification preference; and
 sending the notification to the selected one of the participants only when the input satisfies the notification preference.

14. The method of claim 1, further comprising the steps of:
 receiving a notification preference associated with a selected one of the participants, wherein the notification preference specifies receiving only important events;
 determining whether the input represents an important event; and
 sending the notification to the selected one of the participants only when the input represents an important event.

15. The method of claim 1, further comprising the steps of:
 receiving a notification preference associated with a selected one of the participants, wherein the notification preference includes a time interval value and specifies receiving notifications only according to the time interval;
 determining whether the selected participant has viewed the electronic medium since a last notification was sent; and
 sending the notification to the selected one of the participants only when the selected participant has viewed the electronic medium since a last notification was sent.

16. A computer-readable medium comprising one or more sequences of instructions for automatically communicating a notification in response to an interaction with a dynamically updated electronic medium, which instructions, when executed by one or more processors, cause the one or more processors to perform the steps of:
 receiving a configuration of business logic of an electronic medium, wherein the electronic medium is transportable by electronic mail to one or more participants;
 receiving user information identifying one or more participants for receiving notifications relating to changes in the electronic medium;
 sending the electronic medium to one or more participants by electronic mail;
 receiving input from one of at least one participant and an external source, wherein the input represents one or more changes to the electronic medium;
 asynchronously dynamically updating and retrieving content for the electronic medium in response to the input from one of at least one participant and an external source;
 receiving a reason for notification from the business logic based on the input; and
 sending a notification to the participants identified in the user information in response to the occurrence of the dynamic update and retrieval of the content.

17. A computer-readable medium as recited in claim 16, wherein the content is one of XML and HTML.

18. A computer-readable medium as recited in claim 16, wherein the step of sending a notification further comprises rendering a portion of the content to be different from other portions of the content.

19. A computer-readable medium as recited in claim 16, wherein the step of sending the notification further comprises sending the notification to selected ones of a plurality of participants.

20. A computer-readable medium as recited in claim 16, wherein the step of sending the notification further comprises setting a flag indicating an occurrence of the notification.

21. A computer-readable medium as recited in claim 16, wherein the step of sending the notification further comprises sending the notification to at least one participant configured with one of a client, an instant messenger, and electronic mail.

22. A computer-readable medium as recited in claim 16, wherein the step of sending the notification further comprises providing the reason for the notification in the notification.

23. A computer-readable medium as recited in claim 16, wherein the step of sending the notification further comprises defining a priority for the notification.

24. A computer-readable medium as recited in claim 16, wherein the step of sending of the notification further comprises determining a type of notification required by at least one participant receiving the notification.

25. A computer-readable medium as recited in claim 24, wherein the step of determining the type of notification further comprises one of sending a link to the electronic medium, sending an updated version of the electronic medium, and polling to indicate the sending of the notification.

26. A computer-readable medium as recited in claim 16, further comprising the step of receiving information identifying a reason for the notification as part of an electronic medium authoring process that includes the step of receiving the configuration of business logic.

27. A computer-readable medium as recited in claim 16, further comprising the steps of:
 setting a flag that is associated with the electronic medium and that specifies that a notification is present;
 receiving a poll from one or more of the participants;
 providing the notification in response to the poll when the flag is set.

28. A computer-readable medium as recited in claim 16, further comprising the steps of:
 receiving a notification preference associated with a selected one of the participants;
 determining whether the input satisfies the notification preference; and
 sending the notification to the selected one of the participants only when the input satisfies the notification preference.

29. A computer-readable medium as recited in claim 16, further comprising the steps of:
 receiving a notification preference associated with a selected one of the participants, wherein the notification preference specifies receiving only important events;

determining whether the input represents an important event; and sending the notification to the selected one of the participants only when the input represents an important event.

30. A computer-readable medium as recited in claim 16, further comprising the steps of:

receiving a notification preference associated with a selected one of the participants, wherein the notification preference includes a time interval value and specifies receiving notifications only according to the time interval;

determining whether the selected participant has viewed the electronic medium since a last notification was sent; and sending the notification to the selected one of the participants only when the selected participant has viewed the electronic medium since a last notification was sent.

\* \* \* \* \*